(12) United States Patent
Baquet et al.

(10) Patent No.: US 10,627,108 B2
(45) Date of Patent: Apr. 21, 2020

(54) PROCESS FOR PNEUMATICALLY CONVEYING A POWDERY MATERIAL

(71) Applicant: S. A. Lhoist Recherche et Developpement, Ottignies-Louvain-la-Neuve (BE)

(72) Inventors: Hugues Baquet, Marche en Famenne (BE); Johan Heiszwolf, Huldenberg (BE); Joel Letouzey, Roffigny (FR); David Lyons, Fort Worth, TX (US); Chad Timothy Metz, Watauga, TX (US); Howard Braxton Fitzgerald, Ball Ground, GA (US); Gregory M. Filippelli, Dillsburg, PA (US)

(73) Assignee: S.A. Lhoist Recherche et Developpement, Ottignies-la-Neuve (BE)

( * ) Notice: Subject to any disclaimer, the term of this patent is extended or adjusted under 35 U.S.C. 154(b) by 416 days.

(21) Appl. No.: 15/361,618

(22) Filed: Nov. 28, 2016

(65) Prior Publication Data
US 2018/0149358 A1    May 31, 2018

(51) Int. Cl.
| F23J 7/00 | (2006.01) |
| B65G 53/52 | (2006.01) |
| F23J 15/00 | (2006.01) |

(52) U.S. Cl.
CPC .............. *F23J 7/00* (2013.01); *B65G 53/521* (2013.01); *F23J 15/003* (2013.01); *F23J 15/006* (2013.01)

(58) Field of Classification Search
CPC . B65G 53/521; F23J 7/00; F23J 15/003; F23J 15/006
USPC ......................................... 406/127, 128, 144
See application file for complete search history.

(56) References Cited

U.S. PATENT DOCUMENTS 3,165,061 A * 1/1965 Smith ....................... F04F 7/00
417/199.1

FOREIGN PATENT DOCUMENTS

| EP | 0605245 A1 | 7/1994 |
| FR | 2941388 A1 | 7/2010 |
| JP | 61259747 A | 11/1986 |
| JP | 10329947 A | 12/1998 |
| JP | 2005213007 A | 8/2005 |
| SU | 1418220 A1 | 8/1988 |

* cited by examiner

*Primary Examiner* — William R Harp
(74) *Attorney, Agent, or Firm* — Whitaker Chalk Swindle & Schwartz PLLC; Charles D. Gunter, Jr.

(57) ABSTRACT

Process and device for pneumatically conveying a powdery material comprising the steps of
Pneumatically conveying a powdery material in a pneumatic conveying pipeline (first) and into said recipient by a flow generated by a blower,
A powdery material dosing step,
A fluctuation step of pressure drop in said pneumatic conveying pipeline or up to said recipient,
wherein a sonic device generates sonic waves inside said pneumatic conveying pipeline or up to said recipient and provides a counteraction on the fluctuation step of the pressure drop in said pneumatic conveying pipeline or up to said recipient.

8 Claims, 10 Drawing Sheets

PROCESS FOR PNEUMATICALLY CONVEYING A POWDERY MATERIAL

The present invention relates to a process for pneumatically conveying a powdery material, in particular a powdery sorbent, comprising the steps of Pneumatically conveying a powdery material, in particular a powdery sorbent, in a first pneumatic conveying pipeline from a powdery material, in particular a powdery sorbent, storage tank to a recipient zone, said first pneumatic conveying pipeline comprising a pipeline wall and being connected to said powdery material, in particular said powdery sorbent storage tank and to said recipient zone, said powdery material, in particular said powdery sorbent, being pneumatically transported inside said first pneumatic conveying pipeline and into said recipient zone by a flow generated by a blower connected to said first pneumatic conveying pipeline and blowing conveying fluid inside said first pneumatic conveying pipeline in which particles of said powdery material, in particular said powdery sorbent, are transported, A powdery material, in particular a powdery sorbent, dosing step by means of a dosing means for dosing an amount of said powdery material, in particular said powdery sorbent, when entering from said powdery material, in particular said powdery sorbent, storage tank into said first pneumatic conveying pipeline, said first pneumatic conveying pipeline being connected to said powdery material, in particular said powdery sorbent, storage tank through said dosing means, A fluctuation step of pressure drop in said first pneumatic conveying pipeline and/or up to said recipient zone.

During pneumatic conveying of a powdery material, in particular a powdery sorbent, between a powdery material, in particular a powdery sorbent, storage tank and a recipient zone, pressure drop fluctuations occur at any time, very frequently and are difficult to control. The fluctuations in pressure drop may be due to a number of intrinsic factors of the pneumatic conveying process or to external event.

Such fluctuations of pressure drop are disturbing the entire pneumatic conveying of the powdery material, in particular the powdery sorbent, to be conveyed causing different kinds of perturbations. Amongst other perturbations, one can find the fact that the fluctuations in pressure drop are causing a modification of the conveying velocity of the powdery material/sorbent.

Powdery material/sorbent flows have a saltation velocity under which the powdery material, in particular the powdery sorbent, starts settling in the pneumatic conveying pipe while conveying fluid blown by blowers is given a safe nominal value of velocity, greater than the saltation velocity to prevent the powdery material, in particular the powdery sorbent, settling inside the pneumatic conveying pipe.

Unfortunately, many fluctuations occur at any time during a pneumatic conveying of a powdery material, in particular a powdery sorbent, causing the pressure drop instability inside the pneumatic conveying pipeline.

Indeed, blowers are characterized by a curve between pressure drop and flowrate. The pressure drop, i.e. the difference of the pressure inside the recipient zone and the pressure at the entrance of the first conveying pipe, is the one imposed by the plant inside which pneumatic conveying shall be performed and the characterizing curve of the blower results in a flowrate into the pneumatic conveying of the powdery material, in particular the powdery sorbent, depending on the value of the pressure occurring inside the plant.

As soon as there is a small fluctuation in pressure drop (caused for example, without being limited thereto, by a change in atmospheric conditions, a change in the temperature of the conveying fluid, a reduction of a pipeline section which can be due to a clogging, a partial clogging, an object disturbing the blower flow, discontinuous loading of a powdery material, notably with a rotary valve, electric power cut or fluctuation in voltage (or current), soot blowing load (capacity) change, change of operating conditions in the gas scrubber, bag filter pulses, electrostatic precipitator rapping, variations in fuel injection, variations in fuel quality (e.g. energy, moisture and ash content), rate changes of the main, forced draft or induced draft, fans of the plant but also non homogeneity of the flowrate of the powdery material, in particular the powdery sorbent, dosed and fed to the pneumatic conveying pipeline, agglomerates of powder material in the air flow by the dosing means, etc.), the pressure drop starts decreasing or increasing without it being possible to control quickly enough for the pneumatic conveying of the powdery sorbent/material to not be disturbed. These fluctuations in pressure at the recipient zone of the process flue gas can affect directly the gas flow rate used in the pneumatic conveying pipeline prior to injection because the control of the blowers, if any, is usually not sufficiently reactive. There is consequently a change in the flow regime, leading to a change in the mass ratio of powdery material to conveying fluid. As a consequence, for example, without again being limited thereto, when the pressure drop increases, the pneumatic velocity or flowrate of the conveying fluid is reduced such that the velocity of the conveying fluid possibly reaches a value lower than the safe nominal value velocity, causing therefore the powdery material, in particular the powdery sorbent, pneumatically conveyed, to sediment inside the pneumatic conveying pipeline. Sedimentation of the powdery material, in particular powdery sorbent, will cause the pressure drop to increase, leading to an even lower gas flow rate. Clearly, for systems where the gas flow rate is not actively controlled or for systems where the gas flow rate cannot be controlled sufficiently fast, such a pneumatic transport system is unstable.

Conversely, in case of a decrease of the pressure drop, a too high flow can cause the powdery material to stick on the walls of the pipes because of the higher impaction force of the powdery material in regions where changes of cross sections or of direction are present.

The powdery material, in particular the powdery sorbent, starts therefore to accumulate inside the pneumatic conveying pipeline causing on its turn fluctuations of the pressure drop as the passing diameter of the pipeline available for pneumatic conveying is reduced, causing an increase in pressure drop having on its turn consequence on the pneumatic conveying.

As one can understand, the smallest single fluctuation in the pressure drop, which occurs whatever the level of design optimization of the pneumatic conveying, will have strong consequence in the efficiency of the pneumatic conveying of the powdery material, in particular the powdery sorbent, inside the pneumatic conveying pipeline.

Sometimes, the pressure in the flue gas duct will vary, depending on the process operation (examples of the cause of these pressure fluctuations are provided below). Depending on the dosing means, the flue gas pressure fluctuations will cause gas flow fluctuations in the pneumatic conveying system.

This phenomenon of fluctuations is occurring in any conveying fluid when blown. The phenomenon is of course further amplified when a powdery material, in particular a powdery sorbent, is conveyed as the powdery material, in particular the powdery sorbent, itself cannot recover easily the right pressure drop as soon as it starts accumulating inside the pneumatic conveying pipeline. Indeed, once the powdery material begins to deposit as the gas velocity has fallen below the saltation velocity, such powder is not easily re-entrained.

The present invention solves at least a part of these drawbacks by providing a process allowing the efficient improvement of pneumatic conveying of a powdery sorbent in a pneumatic conveying pipeline between a powdery material, in particular a powdery sorbent, storage tank and a recipient zone.

According to the present invention, by the terms recipient zone, it is meant one or more of the following: a furnace or an after burning chamber or a post-combustion zone or another storage recipient for collecting the powdery sorbent, a channel where the powdery material, in particular the powdery sorbent, shall be injected through pneumatic conveying, such as a flue gas duct (i.e. in a furnace or connected to a furnace, in a heat exchanger or connected to a heat exchanger, in a combustion zone or connected to a combustion zone, in an after burning chamber or connected to a burning chamber, in a post-combustion zone or connected to a combustion zone and the like), a pipeline inside a plant, filters devices, such as electrostatic precipitators, bag filters, gas scrubbers, such as dry, semi-wet (spray dry absorbers) or wet scrubbers . . . ; for the filter devices or the gas scrubbers, the injection point can notably be in the duct before or at the entrance of them.

By the terms pneumatic conveying of powdery material, it is meant within the scope of the invention pneumatic conveying by negative pressure or by positive pressure, pneumatic conveying of powdery material as a dense phase or strand phase or dilute phase, in particular dilute phase, in conveying fluid, or as a discontinuous phase in conveying fluid.

By the terms "connected to", it is meant that one element is connected to another element directly or indirectly, meaning that the elements are in communication one to each other but other elements can be inserted in between.

To solve the aforementioned problem, it is provided according to the present invention, a process for pneumatically conveying a powdery material, in particular a powdery sorbent, characterized in that a sonic device generates sonic waves inside said first pneumatic conveying pipeline and/or up to said recipient zone and provides a counteraction to the fluctuation step of the pressure drop in said first pneumatic conveying pipeline up to said recipient zone.

It has been indeed surprisingly realized that, for the turbulent flows considered here, the sonic waves generate an increase of pressure drop and that the sonic waves have the capability to counteract on the pressure fluctuations in said first conveying pipeline and/or in said recipient zone.

Sonic waves are sometimes used for de-agglomerating accumulated particles, such as powdery sorbent particles or for preventing or cleaning or removing the accumulated particles in large equipment employing gas solid flows. In these applications the sonic waves generate turbulence in stagnant zones, i.e. areas where the gas velocity is nearly zero resulting in laminar flow conditions, or cause the walls of duct work to mechanically vibrate to prevent particle adhesion. These two mechanisms will prevent particle sedimentation and adhesion to the wall of the duct. However, according to the present invention, the sonic waves are used to increase the pressure drop of the pneumatic conveying flow and the sonic waves according to the present invention are used in such a way that they are able to counteract the fluctuation step of the pressure drop, thereby minimizing perturbations causing the accumulation of powdery material in said pneumatic conveying instead of cleaning or retroacting on the accumulation of particles.

According to the present invention, said conveying fluid has a flow comprising a boundary layer along said pipeline wall of which the boundary layer thickness changes in regions of varying cross section of said pipeline and regions where the direction changes.

Advantageously, according to the process of the invention, the blower is connected to said first pneumatic conveying pipeline and is blowing conveying fluid inside said first pneumatic conveying pipeline but also said conveying fluid at least partially through said sonic device.

Indeed, the fact that a blower blows conveying fluid inside said pneumatic conveying pipe, but also at least partially through said sonic device further increases the pressure drop in said first pneumatic conveying pipeline, and is more efficient in counteracting the pressure drop fluctuations.

In a particular embodiment, the first pneumatic conveying pipeline is a rigid pipeline, in particular in stainless or carbon steel. This particular embodiment is even more performing when combined with the blower blowing conveying fluid inside said first pneumatic conveying rigid pipeline.

In another particular embodiment, the first pneumatic conveying pipe is a flexible pipeline, in particular in polymer like polyurethane.

Indeed, according to this preferred embodiment, the fluctuations of pressure drop are surprisingly counteracted by the sonic waves generating an increase of pressure drop.

The adhesion of fine particles of powdery material with a mean particle size $d_{50}$ lower than 100 μm on the wall of a rigid pneumatic transportation pipeline is occurring in areas such as bends, elbows, section reductions or enlargement of said pipeline. Once adhesion of the particles to the wall of the pipeline occurs, if the powdery material, in particular the powdery sorbent, is hydrated lime or a mixture of sorbent comprising hydrated lime, carbonation of the hydrated lime occurs, resulting in the formation of a hard layer that is difficult to remove.

The problem of adhesion to solid objects is increasingly important for particles of decreasing particle diameter because of the increased contribution of electrostatic forces in comparison with friction, impulse and gravitation forces. Powdery sorbent particles with diameter<100 μm are generally classified as cohesive according to the Geldart classification (see Cocco, R.; Reddy-Karri, S. B.; Knowlton, T. Introduction to Fluidization. *AICHE CEP* 2014, No. November, 21-29; Geldart, D. Types of Gas Fluidization. *Powder Technol.* 1973, 7 (5), 285-292) (Geldart Powder group C) and their flow properties can be evaluated in detail using the flow function classification according to Jenicke (see CAGU, A. S.; DEVECI, B. N.; OKUTAN, C. H.; SIRKECI, D. A. A.; TEOMAN, E. Y. Flow Property Measurement Using the Jenike Shear Cell for 7 Different Bulk Solids. *Proc. Eur. Congr. Chem. Eng.* 2007, No. September, 16-20; Jenicke, A. W. Gravity Flow of Bulk Solids. *Bull. Univ. Utah* 1961, 52 (29), 1-309; Jenicke, A. W. Storage and Flow of Solids. *Bull. Univ. Utah* 1964, 53 (26), 1-198; Pendyala, R.; Jayanti, S.; Balakrishnan, A. R. Flow and Pressure Drop Fluctuations in a Vertical Tube Subject to Low Frequency Oscillations. *Nucl. Eng. Des.* 2008, 238 (1), 178-187). With the Jenicke flow function, the internal cohesion of the powder is measured and this can be regarded as a good indicator for the adhesion properties of a powder.

For the adhesion problem of pneumatic transport of powdery sorbent in rigid pipes, the above outlined cleaning mechanisms cannot explain the prevention of adhesion.

In conventional application of sonic waves, the waves are used to create turbulence in systems where the gas velocity is nearly zero inside stagnant zones of the equipment.

The turbulence of a fluid flow in a pipe can be assessed with the Reynolds number:

$$Re = \frac{\rho v d}{\mu}$$

In which $\rho$ is the conveying fluid density (kg/m$^3$), v is the conveying fluid velocity (m/s), d is the pipe diameter (m) and $\mu$ is the conveying fluid viscosity (Pa s). If they Reynolds number is larger than 2000 (i.e. Re>2000), the conveying fluid is considered turbulent.

For normal transportation of powdery sorbent, the conveying fluid may be ambient air, the tube diameter is about 0.10 m (4 inch) and the conveying air velocity is typically 20 m/s. Under these conditions the Reynolds number is above one million which implies that the fluid is highly turbulent.

This means that in the case of pneumatic conveying, the sonic waves do not serve to provide local turbulence to laminar flow zones to initiate cleaning or removing the accumulated particles mechanism and thus cannot be responsible for counteracting the fluctuations in pressure drop.

In addition, an increase in pressure drop because of sonic air flow is not expected for highly turbulent flows (see Pendyala, R.; Jayanti, S.; Balakrishnan, A. R. Flow and Pressure Drop Fluctuations in a Vertical Tube Subject to Low Frequency Oscillations. *Nucl. Eng. Des.* 2008, 238 (1), 178-187).

While for duct work and equipment walls, movement of the metal parts is possible because of the large size of the parts and/or thinner walls which therefore have lower flexural strength and hence are more deformable, such movement is not possible for 0.10-0.20 m (4-8 inch) diameter steel or polymer (plastic) pipes used as first pneumatic conveying pipeline. The combination of surface area and wall thickness of the pneumatic conveying pipeline prevents any significant radial movement because of sonic waves.

It is therefore unexpected that the application of sonic waves counteract the fluctuations in pressure drop, thereby also avoiding adhesion of the powdery material, in particular the powdery sorbent particles to the rigid pipe walls. This non-obvious result is caused by the way the sonic waves are generated such as in a preferred embodiment, via a blow-through system in contrast to the conventional systems where a dead end sound generator is used. The consequence of the blow-through generation of sonic waves is a more intense mixing of the gas solid mixture by the start-stop nature of the flow.

In another preferred embodiment according to the present invention, the sonic device generating sonic waves is an infrasound device generating infrasonic waves.

In yet another preferred embodiment of the process according to the present invention, when said sonic device provides a counteraction on the fluctuation step of the pressure drop in said first pneumatic conveying pipeline and/or up to said recipient zone, said sonic device provides a smoothing action and/or a masking action which can be also called compensating action, on the fluctuation step of the pressure drop in said first pneumatic conveying pipeline and/or up to said recipient zone.

In a particular embodiment of the process according to the present invention, infrasonic waves are generated inside an infrasound device comprising a first chamber and a second chamber, both first and second chamber being connected to each other by a tube, said infrasonic waves being generated by an exciter inside the first chamber providing infrasound pulses to said conveying fluid blown at least partially inside said first chamber, said generated infrasonic waves being transported through the tube to reach the second chamber.

More preferably, in the process according to the present invention, the first chamber is divided into a first compartment and a second compartment, said first compartment being in connection to said second compartment through a passing hole, said first compartment comprising an internal channel inside which a moving piston is moved from a first position to a second position and from said second position to said first position by a power source, located externally with respect to the first chamber and forming the exciter, said internal channel being concentrically installed inside said first compartment, said infrasonic waves being generated by the moving piston and transported by said conveying fluid from said first compartment, to said second compartment, through the passing hole before being transported through the tube to reach the second chamber. The conveying fluid can be blown through the piston.

In another advantageous embodiment, rotation controllers are included for exciter power source (motor) to avoid inappropriate working frequencies and for increasing efficiency and safety.

In another preferred embodiment, the sonic device creates a pressure increase in the first pneumatic conveying pipeline close to the sonic generator of between 20 and 200 mbar, in particular of at least 30 mbar, in particular of at most 150 mbar.

In an advantageous embodiment according to the present invention, the process further comprises a step of deriving a portion of said conveying fluid blown by the blower before entering the first compartment or connected to the first compartment and introducing it inside the second chamber.

In a particular embodiment, the powdery material, in particular the powdery sorbent is selected from the group consisting of hydrated lime, hydrated or semi-hydrated dolime, limestone, dolomite, quick lime, quick dolime, sodium carbonate or bicarbonate, sodium sesquicarbonate dihydrate (also known as Trona), halloysite, sepiolite, a carbonaceous organic compound selected from active carbon and lignite coke, fly ash or a mixture of any of these compounds.

In a particular embodiment, the powdery material, in particular the powdery sorbent, is preferably a mainly mineral powdery sorbent, meaning that it can be mainly mineral by nature but can typically contain 30 weight % or less, in particular 20 weight % or less, more particularly 15% or less of carbonaceous organic compound selected from active carbon and lignite coke with respect to the weight of the powdery sorbent.

The powdery material, in particular the powdery sorbent is preferably a mainly calcic mineral sorbent containing an amount of calcic sorbent greater than 50 weight %, in particular greater than 70% with respect to the weight of the powdery sorbent, preferably chosen in the group consisting of hydrated lime, hydrated or semi-hydrated dolime, limestone, dolomite, quick lime, quick dolime, or a mixture of any of these compounds.

In yet another preferred embodiment, said conveying fluid is air, inert gas, exhaust gases, or mixture thereof.

In a further preferred embodiment, sonic waves, in particular infrasonic waves, transported inside said first pneumatic conveying pipeline during said transport of powdery material also contacts said dosing means.

In another preferred embodiment, sonic waves, in particular infrasonic waves, travel inside said first pneumatic conveying pipeline during said transport of powdery material and preferably also travel (or are distributed) up to the recipient zone.

In another preferred embodiment in the process according to the present invention, sonic waves, in particular infrasonic waves, transported inside said first pneumatic conveying pipeline during said transport of powdery material are prevented from reaching the blower due to a Helmholtz bass trap connected to said first chamber or preferably on the pipeline between the blower and the first chamber.

In a particular embodiment according to the present invention, the process further comprised an emergency mode and an operating mode, wherein in emergency mode, the blown conveying fluid is prevented from entering said first chamber and is diverted and blown directly to said first pneumatic conveying pipeline, downstream of the sonic device and wherein in operating mode, the blown conveying fluid is provided at least partially to said first chamber.

The present invention also relates to a process for improving capture of polluting compounds from flue gases comprising the steps of:

Burning a fuel and/or a material to be burned or heating a material to be heated or melted, producing flue gases in a recipient zone, Pneumatically conveying a powdery sorbent provided for capturing said polluting compounds according to the present invention, said recipient zone being a flue gas duct, Capturing polluting compounds by said powdery sorbent inside said flue gas duct thereby depleting the flue gas from polluting compounds.

Specifically, the process for improving the capture of polluting compounds from flue gases comprises the steps of:

Burning fuel and/or a material to be burned or heating a material to be heated or melted, producing flue gases in a recipient zone, Pneumatically conveying a powdery sorbent in a first pneumatic conveying pipeline from a powdery sorbent storage tank to a recipient zone being a flue gas duct, said first pneumatic conveying pipeline comprising a pipeline wall and being connected to said powdery sorbent storage tank and to said recipient zone, said powdery sorbent being pneumatically transported inside said first pneumatic conveying pipeline and into said flue gas duct by a flow generated by a blower connected to said first pneumatic conveying pipeline and blowing conveying fluid inside said first pneumatic conveying pipeline in which particles of said powdery sorbent are transported, A powdery sorbent dosing step by means of a dosing means for dosing an amount of said powdery sorbent when entering from said powdery sorbent storage tank into said first pneumatic conveying pipeline, said first pneumatic conveying pipeline being connected to said powdery sorbent storage tank through said dosing means, A fluctuation step of pressure drop in said first pneumatic conveying pipeline and/or up to said flue gas duct, A capture of polluting compounds by said powdery sorbent inside said flue gas duct thereby depleting the flue gas from polluting compounds.

According to the present invention, fuel can mean a gas, a liquid, a paste or a solid, notably coal and/or oil.

According to the present invention, by the terms material to be burned or material to be heated or melted, it is meant, without being limited thereto, garbage material (domestic or industrial or clinical), silicate material for producing cement or glass by heating raw material to be heated, limestone or dolostone (dolomite), metal ore, in particular iron ore, brick or tiles and the like; the material to be heated or burned can also be recycled material like scraps of steel, batteries . . . .

Typically, the treatment of gases, in particular flue gases, requires abatement of acid gases, notably HCl, $SO_2$, $SO_3$ and/or HF, which reduction may be carried out under dry conditions, by injecting a substance, often mineral, dry and powdery, into a flue gas flow or through a filter-bed comprising solid particles either fixed or in motion. In this case, the powdery compound generally comprises a calcium-magnesium-based compound, in particular lime, preferably slaked or hydrated lime or a sodium compound like a sodium carbonate or bicarbonate. Other compounds may also be used notably those used for reducing dioxins, furans and/or heavy metals including mercury, for example carbonaceous substance like active carbon or lignite coke or mineral substance, like those based on phyllosilicates, such as sepiolite or halloysite or the like.

Various solutions have been developed to improve the polluting compounds capture, such as for example the solution described in WO2014/206880. WO2014/206880 describes a device for injecting a powdery mineral compound into a flue gas duct comprising a source of powdery compound, a powdery compound injection piping, supplied by the source of powdery compound and laid out so as to open into said gas duct. The device for injecting a powdery compound further comprises a source of monophasic liquid aqueous phase and at least one piping for injecting a monophasic liquid aqueous phase as droplets. According to this document, the piping for injecting a monophasic liquid aqueous phase is located in a peripheral space localized around the external face of the powdery compound injection piping.

Another solution is described in document JPS61259747. According to this document, an absorbent such as slaked lime is fed inside a solid-gas contactor wherein waste gas is also fed. The solid-gas contactor comprises superimposed perforated plates. The waste gas is fed at the bottom side of the contactor and will escape the contactor further depleted in captured pollutant at the upper stage of the contactor after having passed through the perforated plates. The absorbent is fed above the waste gas, but under the perforated plates inside the contactor. Ultra-low frequency sound in air is generated and introduced in the contactor to form a multi-stage jet stream bed solid-gas contactor.

The emission of pollutant in the atmosphere becomes more and more regulated and the authorized level of polluting compounds released in flue gas is severely controlled. For this reason, industries, called herein after "burning industries" using burners such as garbage incinerator, but also industries using furnaces such as cement industries, lime industries, glass industries are more and more controlling polluting compounds emission in flue gas treatment to stick with environmental requirements.

Unfortunately, even if many precautions are taken to react and pro-act to reduce the level of pollutants in flue gases, all of those precautions are causing themselves fluctuations in the pneumatic conveying of the powdery sorbent and therefore deficiencies in the pollutants capture.

The present invention solves at least a part of these drawbacks by providing a process that improves the efficiency of pollutants capture from flue gases whereby fluctuations and so deficiencies in the pollutant capture are reduced as much as possible.

To solve this problem, it is provided according to the present invention, a process for improving capture of polluting compounds from flue gases as mentioned previously, characterized in that a sonic device generates sonic waves inside said first pneumatic conveying pipeline and/or up to said recipient zone and provides a counteraction on the fluctuation step of the pressure drop in said first pneumatic conveying pipeline and/or up to said recipient zone, said recipient zone being said flue gas duct.

According to the present invention, the counteraction on the fluctuation step of the pressure drop in said first pneumatic conveying pipeline causes the improvement of the pollutant compounds capture by reducing undesired fluctuations in powdery sorbent, in particular powdery mineral sorbent, fed in the flue gas duct by sonic waves transported inside said first pneumatic conveying pipeline during said pneumatic conveying of powdery sorbent.

Indeed, it has been found surprisingly that sonic waves transported inside said first pneumatic conveying pipeline during said pneumatic conveying of powdery sorbent has a direct impact on fluctuations in pneumatic conveying of powdery sorbent fed in the flue gas duct.

It has been shown according to the present invention that the appropriated use of sonic waves, creating an increase of the pressure drop inside said first pneumatic conveying pipeline during said transport of powdery sorbent, can solve the fluctuations in the powdery material, in particular the powdery sorbent, injected inside the flue gas duct.

The sonic waves travelling inside said first pneumatic conveying pipeline during said transport of powdery sorbent have been shown to prevent deficiencies in the pollutants capture inside the flue gas duct by counteracting very quickly on fluctuations in the pressure drop, thereby preventing fluctuating pressure drops from causing the velocity of the particles to fall below the saltation velocity where they would then begin to settle and enabling them to be conveyed by the pneumatic transport and as a consequence to still reach the flue gas duct.

Indeed, this effect is reached by the combination of the proper use of the sonic waves creating an increase of pressure drop in the first pneumatic conveying pipeline together with the collision between the particles of the powdery sorbent and the sonic waves having fluctuating frequency of the waves that change the location of the antinodes and the vibration nodes of the sound in the pipe.

Typically, when the clogging starts, the diameter of the first pneumatic conveying pipeline is reduced and this will also change the weight ratio between said conveying fluid and said powdery material, in particular said powdery sorbent for the same reason as aforementioned.

Therefore, according to the present invention, the sonic waves transported inside said first pneumatic conveying pipeline during said conveying of powdery sorbent have been shown to improve the level of pollutants capture by counteracting on fluctuations in the pressure drop in the first pneumatic conveying pipeline and thereby ensuring adequate/optimizing flowrate of powdery sorbent to the flue gas duct.

In a preferred embodiment of the process according to the present invention, a fluctuation step of operating conditions of said burning step of fuel and/or said material to be burned or to be heated or to be melted generates a first signal and/or the fluctuation step of the pressure drop inside said first conveying pipeline, said process further comprising an adjusting step of said amount of powdery sorbent in response to said first signal and/or to said fluctuation step of the pressure drop inside said first conveying pipeline.

More and more, burning industries use an analyzer at the exit of the flue gas duct to measure level of polluting compounds (example of first signal) and have put in place over time a control loop in order to control the amount of powdery sorbent used to capture those pollutants. For example, if the level of $SO_2$ starts to increase, the amount of powdery sorbent will be increased to improve the capture of this pollutant. If the level of $SO_2$ starts to decrease, the amount of powdery sorbent will be decreased.

Other "burning industries" are not using continuous analysis but as a precautionary measure, they adjust the amount of powdery sorbent based on several criteria and measurement (first signal), such as the level of sulfur in the fuel which will be used, pre-analysis or data regarding the level of chloride or sulfur present in the garbage to be burned or the material to be heated (metal ore, recycling material . . . ), based on the expected yield of the combustion or the heating step, the rotation of people running the furnace, the primary air level introduced in the furnace to do the combustion of the material to be burned, based on temperature, atmospheric pressure, . . . . The amount of powdery sorbent is then fixed manually for a predetermined period of time and changed when a new condition (first signal) arises.

More particularly, when a first signal arises from exhaust gases from the combustion of fuel and/or material to be burned, such as an increase in pollutants level, a decrease of pollutants level, the response to be given is to change the amount of powdery sorbent to be introduced inside the flue gas duct. The change in the amount of powdery sorbent which is blown inside the first pneumatic conveying pipeline by the blower yields to a change in the weight ratio between said conveying fluid and said powdery sorbent which creates fluctuations in the pressure drop of the pneumatic transport, thereby causing fluctuations in the powdery material, in particular the powdery sorbent injected inside the flue gas duct.

Indeed, the change in the amount of powdery sorbent causes fluctuations in the operation of the pneumatic conveying system causing itself fluctuations of the conveying fluid flow rate to adapt itself to the counter-pressure as the blowing flowrate stays quite stable at the exit of the blower in the first pneumatic conveying pipeline.

In response to a first signal, changes occur in the weight ratio between said powdery sorbent and said conveying fluid. The particles of the powdery sorbent are conveyed with fluctuating speed in the first pneumatic conveying pipeline which can increase or decrease.

According to another preferred embodiment according to the process of the invention, said first signal is such as wind speed of environment at the outlet of the chimney, atmospheric pressure of environment at the outlet of the chimney or outside said flue gas duct, temperature of the flue gas, nature of the fuel, sulfur content of the fuel, sulfur content of the flue gas, chloride content of the flue gas, mercury content of the flue gas, chloride content of material to be burned or heated, sulfur content of material to be burned or heated, mercury content of material to be burned or heated, and their combination.

In another preferred embodiment of the process for improving capture of polluting compounds from flue gases, the sonic device creates a pressure increase in the first pneumatic conveying pipeline close to the sonic generator of between 20 and 200 mbar, in particular of at least 30 mbar, in particular of at most 150 mbar.

Advantageously, according to the process of the invention, the blower is connected to said first pneumatic conveying pipeline and is blowing conveying fluid inside said first pneumatic conveying pipeline but also said conveying fluid at least partially through said sonic device.

Indeed, the fact that a blower blows conveying fluid inside said pneumatic conveying pipeline, but also at least partially through said sonic device further increases the pressure drop in said first pneumatic conveying pipeline, thereby acting even more efficiently for counteracting the pressure drop fluctuations which impact positively capture of polluting compounds from flue gases by said powdery sorbent conveyed through said first pneumatic conveying pipeline and/or up to said flue gas duct.

In a preferred embodiment, the first pneumatic conveying pipeline is a rigid pipeline, in particular in stainless steel. This preferred embodiment is even more performing when combined with the blower blowing conveying fluid inside said first pneumatic conveying rigid pipe.

Indeed, according to this preferred embodiment, the fluctuations of pressure drop are surprisingly counteracted by the sonic waves generating an increase of pressure drop.

The adhesion of fine particles of powdery material with a mean particle size $d_{50}$ lower than 100 µm on the wall of a rigid pneumatic transportation pipeline is occurring at areas such as bends, elbows, section reductions or enlargement of said pipeline. Once adhesion of the particles to the wall of the pipeline occurs, if the powdery sorbent is hydrated lime or a mixture of sorbent comprising hydrated lime, carbonation of the hydrated lime occurs, resulting in the formation of a hard layer that is difficult to remove.

The problem of adhesion to solid objects is increasingly important for particles of decreasing particle diameter because of the increased contribution of electrostatic forces in comparison with friction, impulse and gravitation forces. Powdery sorbent particles with diameter<100 µm are generally classified as cohesive according to the Geldart classification and their flow properties can be evaluated in detail using the flow function classification according to Jenicke. With the Jenicke flow function, the internal cohesion of the powder is measured and this can be regarded as a good indicator for the adhesion properties of a powder.

For the adhesion problem of pneumatic transport of powdery sorbent in rigid pipes, the above outlined mechanism cleaning mechanisms cannot explain the prevention of adhesion.

In conventional application of sonic waves, the waves are used to create turbulence in systems where the gas velocity is nearly zero inside stagnant zones of the equipment.

The turbulence of a fluid flow in a pipe can be assessed with the Reynolds number:

$$Re = \frac{\rho v d}{\mu}$$

in which $\rho$ is the conveying fluid density (kg/m$^3$), v is the conveying fluid velocity (m/s), d is the pipe diameter (m) and $\mu$ is the conveying fluid viscosity (Pa s). If they Reynolds number is larger than 2000 (i.e. Re>2000), the conveying fluid is considered turbulent.

For normal transportation of powdery sorbent the conveying fluid may be ambient air, the tube diameter is about 0.1 m (4 inch) and the conveying air velocity is typically 20 m/s. Under these conditions the Reynolds number is above one million which implies that the fluid behaves highly turbulent.

This means that in the case of pneumatic conveying, the sonic waves do not serve to provide local turbulence to laminar flow zones to initiate cleaning or removing the accumulated particles mechanism and thus cannot be responsible for counteracting the fluctuations in pressure drop.

In addition, an increase in pressure drop because of sonic air flow is not expected for highly turbulent flows (see Pendyala, R.; Jayanti, S.; Balakrishnan, A. R. Flow and Pressure Drop Fluctuations in a Vertical Tube Subject to Low Frequency Oscillations. *Nucl. Eng. Des.* 2008, 238 (1), 178-187).

While for duct work and equipment walls movement of the metal parts is possible because of the large size of the parts, such movement is not possible for 0.10-0.20 m (4-8 inch) diameter steel pipes used as first pneumatic conveying pipeline. The combination of surface area and wall thickness of the pneumatic conveying pipeline prevent any significant radial movement because of sonic waves.

It is therefore unexpected that the application of sonic waves counteract the fluctuations in pressure drop, thereby also avoiding adhesion of the powdery sorbent particles to the rigid pipe walls. This non-obvious result is caused by the way the sonic waves are generated such as in a preferred embodiment, via a blow-through system in contrast to the conventional systems where a dead end sound generator is used. The consequence of the blow-through generation of sonic waves is a more intense mixing by the start-stop nature of the flow.

In another preferred embodiment according to the present invention, the sonic device generating sonic waves is an infrasound device generating infrasonic waves.

In yet another preferred embodiment of the process for improving capture of polluting compounds from flue gases according to the present invention, when said sonic device provides a counteraction on the fluctuation step of the pressure drop in said first pneumatic conveying pipeline and/or up to said flue gas duct, said sonic device provides a smoothing action and/or a masking action which can be also called compensating action, on the fluctuation step of the pressure drop in said first pneumatic conveying pipeline and/or up to said flue gas duct.

In a particular embodiment of the process according to the present invention, infrasonic waves are generated inside an infrasound device comprising a first chamber and a second chamber, both first and second chamber being connected to each other by a tube, said infrasonic waves being generated by an exciter inside the first chamber providing infrasound pulses to said conveying fluid blown at least partially inside said first chamber, said generated infrasonic waves being transported through the tube to reach the second chamber.

More preferably, in the process according to the present invention, the first chamber is divided into a first compartment and a second compartment, said first compartment being in connection to said second compartment through a passing hole, said first compartment comprising an internal channel inside which a moving piston is moved from a first position to a second position and from said second position to said first position by a power source, located externally with respect to the first chamber and forming the exciter, said internal channel being concentrically installed inside said first compartment, said infrasonic waves being generated by the moving piston and transported by said conveying fluid from said first compartment, to said second compartment, through the passing hole before being transported through the tube to reach the second chamber. The conveying fluid can be blown through the piston.

In another advantageous embodiment, rotation controllers are included for exciter power source (motor) to avoid inappropriate working frequencies and for increasing efficiency and safety.

In an advantageous embodiment according to the present invention, the process further comprises a step of deriving a portion of said conveying fluid blown by the blower before entering the first compartment or from the first compartment and introducing it inside the second chamber.

Indeed, the existing plant for treating flue gases have been dimensioned according to specific calibration between existing blowers, pneumatic conveying pipeline and pipe duct, dimension of powdery sorbent dosing device and the like.

When the process according to the present invention is to be carried out in existing plants, there is very often a need to adapt an sonic device, in particular an infrasound device to existing plants and sometimes, also, to the length of the first pneumatic conveying pipeline (especially between the dosing device and the flue gas duct) which is very long (more than 100 m) depending on the size of the plant or the constraint of the plant.

Typically, the powdery sorbent feeding rate can be from a plant to another plant from 30 kg/h to 1200 kg/h; the volume flow rate of the powdery sorbent can vary from 130 $m^3/h$ to 800 $m^3/h$ and the pressure of the conveying fluid blown by the blower can vary from 170 mbar to 900 mbar depending on the capabilities of the plant.

Of course, in some cases, when all the conveying fluid is blown by the blower at a high pressure due to the capacity of the plant, this high pressure cannot enter the first chamber without causing damages to the sonic waves, in particular the infrasonic waves quality or to the sonic device, in particular the infrasound device in itself.

It has been therefore foreseen according to the present invention to provide a sonic device, in particular an infrasound device, which is flexible enough to adapt to many plant capacities thereby allowing to derive a portion of the blown conveying fluid directly to the said second chamber as an operating possibility of the sonic, in particular infrasound, device.

In a particular embodiment, the powdery sorbent is selected from the group consisting of hydrated lime, hydrated or semi-hydrated dolime, limestone, dolomite, quick lime, quick dolime, sodium carbonate or bicarbonate, sodium sesquicarbonate dihydrate (also known as Trona), halloysite, sepiolite, a carbonaceous organic compound selected from active carbon and lignite coke, fly ash or a mixture of any of these compounds.

In a particular embodiment, the powdery sorbent is preferably a mainly mineral powdery sorbent, meaning that it can be mainly mineral by nature but can contain typically 30 weight % or less, in particular 20 weight % or less, more particularly 15% or less of carbonaceous organic compound selected from active carbon and lignite coke with respect to the weight of the powdery sorbent.

The powdery material, in particular the powdery sorbent is preferably a mainly calcic mineral sorbent containing an amount of calcic sorbent greater than 50 weight %, in particular greater than 70% with respect to the weight of the powdery sorbent, preferably chosen in the group consisting of hydrated lime, hydrated or semi-hydrated dolime, limestone, dolomite, quick lime, quick dolime, or a mixture of any of these compounds.

In yet another preferred embodiment, said conveying fluid is air, inert gas, exhaust gases, or mixture thereof.

In a further preferred embodiment, infrasonic waves transported inside said first pneumatic conveying pipeline during said transport of powdery sorbent also contacts said dosing means, which increase the accuracy of the amount delivered reducing potential clogging of the dosing means without damaging the dosing device.

In another preferred embodiment, infrasonic waves travels inside said first pneumatic conveying pipeline during said transport of powdery sorbent and preferably also travels (or is distributed) up to the flue gas duct.

In another preferred embodiment in the process according to the present invention, infrasonic waves transported inside said first pneumatic conveying pipeline during said transport of powdery sorbent are prevented to reach the blower due to an Helmholtz bass trap connected to said first chamber or preferably on the pipeline between the blower and the first chamber.

In a particular embodiment according to the present invention, the process further comprised an emergency mode and an operating mode, wherein in emergency mode, the blown transport air is prevented from entering said first chamber and is diverted and blown directly to said first pneumatic conveying pipeline, downstream of the sonic device and wherein in operating mode, the blown conveying fluid is provided at least partially to said first chamber.

Other embodiments of the process according to the present invention are mentioned in the appended claims.

The present invention also relates to a device for improving capture of polluting compounds from flue gases comprising:

a furnace or combustion chamber provided for burning fuel and/or a material to be burned or heated or melted and producing flue gases, said furnace or combustion chamber being connected to a flue gas duct where flue gases generated in said furnace or combustion chamber are directed, a powdery sorbent storage tank connected to said flue gases duct by means of a first pneumatic conveying pipeline, said first pneumatic conveying pipeline being further connected to a blower provided for pneumatically conveying said powdery sorbent from said powdery sorbent storage tank in said first pneumatic conveying pipeline to said flue gas duct, said first pneumatic conveying pipeline comprising a pipeline wall and being connected to said flue gas duct, said blower being provided to generate a flow of conveying fluid inside said first pneumatic conveying pipeline in which particles of said powdery sorbent are transported, a powdery sorbent dosing means provided for dosing an amount of said powdery sorbent when entering from said powdery sorbent storage tank into said first pneumatic conveying pipeline, said first pneumatic conveying pipeline being connected to said powdery sorbent storage tank through said dosing means, a controlling device for adjusting said amount of powdery sorbent in response to a first signal, The device according to the present invention is characterized in that it further comprises a sonic device connected to said first pneumatic conveying pipeline and provided to generate sonic waves inside said first pneumatic conveying pipeline and/or up to said flue gas duct, said sonic device being further provided to counteract on a fluctuation step of the pressure drop in said first pneumatic conveying pipeline and/or up to said flue gas duct.

Advantageously, the device according to the present invention further comprises a mixing device located between said dosing means and said first pneumatic conveying pipeline, provided to mix said powdery sorbent in said conveying fluid.

In a preferred embodiment, the device according to the present invention further comprises a connecting device located between said dosing means and said first pneumatic conveying pipeline. Further in some embodiments, the dosing device and the mixing device are integrated in a single device.

In a preferred embodiment, the device for improving capture of polluting compounds from flue gases according to the present invention, further comprises a cooling device located between said blower and said first pneumatic conveying pipeline.

Preferably, the sonic device provided to generate sonic waves is an infrasound device provided to generate infrasonic waves.

More preferably, said infrasound device comprises a first and a second chamber, both first and second chamber being connected to each other by a tube, said first chamber comprising an exciter located inside said first chamber, provided to generate said infrasonic waves by providing infrasound pulses to said conveying fluid blown at least partially inside said first chamber, said generated infrasonic waves being transported through the tube acting as a resonance pipeline to reach the second chamber.

In a particularly preferred embodiment, the first chamber is divided into a first compartment and a second compartment, said first compartment being in connection to said second compartment through a passing hole, said first compartment comprising an internal channel inside which a moving piston is moved from a first position to a second position and from said second position to said first position by a power source, located externally with respect to the first chamber and forming the exciter, said internal channel being concentrically installed inside said first compartment, said infrasonic waves being generated by the moving piston and transported by said conveying fluid from said first compartment, to said second compartment, through the passing hole before being transported through the tube to reach the second chamber.

In a specific embodiment according to the present invention, said sonic device is connected to said blower and to the first pneumatic conveying pipeline.

In a variant embodiment, said sonic device is connected to a second blower and to the first pneumatic conveying pipeline between the powdery sorbent storage tank and the flue gas duct.

In another variant embodiment according to the invention, said sonic device is connected to a second blower and to the first pneumatic conveying pipeline between the powdery sorbent storage tank and the blower.

It is also preferred according to the present invention that the device comprises an adjustable flowrate distributor pipe connected at a first end either to the blower, between the blower and the first chamber or to the first chamber, preferably to the first compartment of the first chamber and at a second end to the second chamber, said adjustable flowrate distributor pipe being provided for deriving a portion of said conveying fluid blown by the blower and introducing it inside the second chamber.

In a particular embodiment, the powdery sorbent storage tank is a powdery sorbent storage tank of powdery sorbent selected from the group consisting of hydrated lime, hydrated or semi-hydrated dolime, limestone, dolomite, quick lime, quick dolime, sodium carbonate or bicarbonate, sodium sesquicarbonate dihydrate (also known as Trona), halloysite, sepiolite, a carbonaceous organic compound selected from active carbon and lignite coke, fly ash or a mixture of any of these compounds.

Particularly, said conveying fluid is air, inert gas, exhaust gases, or mixture thereof.

In a preferred embodiment, the device according to the present invention comprises an Helmholtz bass trap connected to said first chamber or preferably on the pipeline between the blower and the first chamber, provided to prevent infrasonic waves transported inside said first pneumatic conveying pipeline during said transport of powdery sorbent to reach the blower.

In a further preferred embodiment, the device according to the present invention comprises an emergency device having a first position being an emergency position and a second position being an operating position, said emergency device comprising a switch connected to an emergency pipe connecting directly the blower to the first pneumatic conveying pipeline, downstream the infrasound device, said emergency position being a position wherein the switch prevents the blown conveying fluid from entering said first chamber and diverting it directly to said first pneumatic conveying pipeline, downstream the infrasound device and wherein the operating position is a position wherein the blown conveying fluid is provided at least partially to said first chamber.

In the device according to the present invention, said first signal is such as wind speed of environment at the outlet of the chimney, atmospheric pressure of environment at the outlet of the chimney or outside said flue gas duct, temperature of the flue gas, nature of the fuel, sulfur content of the fuel, sulfur content of the flue gas, chloride content of the flue gas, mercury content of the flue gas, chloride content of material to be burned or to be heated or melted, sulfur content of material to be burned or to be heated or melted, mercury content of material to be burned or to be heated or melted, and their combination.

In a preferred embodiment of the device according to the present invention, said dosing means is selected from a dosing screw, a rotating valve with a vertical shaft or an horizontal shaft, an air slide, a jet feeder, a screw-feeder, an airlock-feeder, a screw pump, a pressure vessel, an air lift, said dosing means being located between said powdery sorbent storage tank and said first pneumatic conveying pipeline being provided to be contacted by sonic waves, in particular infrasonic waves, transported inside said first pneumatic conveying pipeline during said transport of powdery sorbent.

Other embodiments of the device according to the present invention are mentioned in the appended claims Other characteristics and advantages of the present invention will be derived from the non-limitative following description, and by making reference to the drawings and the examples.

In the drawings, FIG. 1A is a schematic representation of a heating process where pneumatic conveying of a powdery material according to the present invention is performed.

In the drawings, the same reference numbers have been allocated to the same or analog element.

Figure 1A:
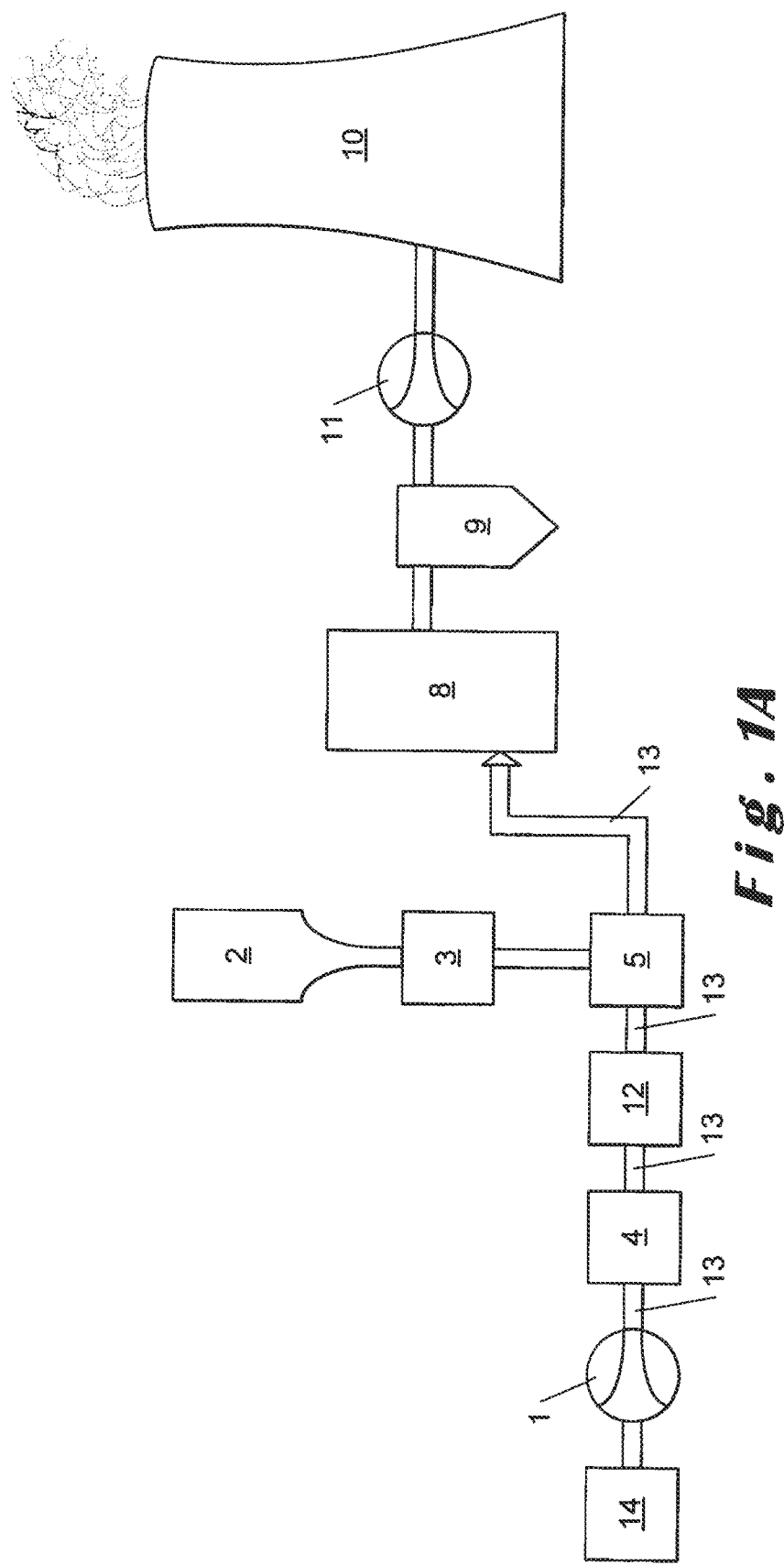
FIG. 1B is another schematic representation of a heating process where pneumatic conveying of a powdery material according to the present invention is performed.
FIG. 1C is another schematic representation of a heating process where pneumatic conveying of a powdery material according to the present invention is performed at different possible locations.
FIG. 1D is another schematic representation of a heating process where pneumatic conveying of a powdery material according to the present invention is performed.

As it can be seen in FIG. 1A, a heating process typically comprises a heating unit such as a heat exchanger (for example a boiler), an incinerator or a furnace 8 which is followed by a filtering unit and/or a scrubber 9. In the heating unit 8, flue gases are contained in a flue gas duct (not illustrated) and exit the heating unit 8 to enter the filtering unit and/or scrubber 9 from which the flue gas is passing through a blower (fan) 11 and evacuated to the chimney 10. It is obvious that even if only one item is represented as equipment 9, there can be consecutive filter and scrubber units, in whatever order, connected by a duct, depending of the flue gas treatment facility of the plants.

The heating process illustrated in FIG. 1 can be a burning process where a furnace 8 is present such as coal, lignite or biomass furnace, cement furnace, lime furnace, glass furnace, metal ore, in particular iron ore, furnace, recycling material furnace or even an incinerator 8 burning for example garbage.

The heating process as illustrated here can also be a process comprising a boiler 8 recovering heat energy from a former step. The boiler 8 can recover the energy from a former burning step in a furnace or in a burner 15 (see FIG. 1C) or from another burning step.

The flue gases can come from the combustion or heating or smelting of the material (garbage, iron ore is a steel plant, limestone, silica) to be burned or from the fuel (coke, coal, gas, lignite, petroleum liquid fuels, . . . )

For this reason, industries, called herein after "burning industries" using burners such as garbage incinerator, but also industries using furnaces are more and more controlling polluting compounds emission in flue gas treatment to stick with environmental requirements.

The treatment of gases, in particular flue gases, requires abatement of acid gases, notably HCl, $SO_2$ and/or HF, which reduction may be carried out under dry conditions, by injecting a substance, often mineral, dry and powdery into a flue gas flow or through a filter-bed comprising solid particles either fixed or in motion. In this case, the powdery compound generally comprises a calcium-magnesium compound, in particular lime, preferably slaked or hydrated lime or a sodium compound like a sodium carbonate or bicarbonate. Other compounds may also be used notably those used for reducing dioxins, furans and/or heavy metals including mercury, for example carbonaceous substance like active carbon or lignite coke or mineral substance, like those based on phyllosilicates, such as sepiolite or halloysite or the like.

As flue gas contains polluting compounds which have to be removed, very often powdery material, in particular powdery sorbent is injected in the flue gas duct to capture a certain level of polluting compounds.

To inject a powdery material, for example a powdery sorbent, the process plant comprises a blower 1 which is connected to a first pneumatic conveying pipeline 13 and blows conveying fluid, such as for example air, inert gas, exhaust gases, or mixture thereof in the first pneumatic conveying pipeline 13.

A powdery material, in particular a powdery sorbent storage tank 2 is connected to the first pneumatic conveying pipeline 13 through a dosing means 3. The first pneumatic conveying pipeline 13 comprising a pipeline wall is connected to said powdery material, in particular said powdery sorbent storage tank 2 and to the flue gas duct of the heating unit 8 and pursue downstream of the heating unit 8.

The conveying fluid has a flow comprising boundary layer along said pipeline wall, but also the particles of said powdery material have a boundary layer around them inside said conveying flow.

The powdery material, in particular the powdery sorbent is therefore pneumatically conveyed in the first pneumatic conveying pipeline 13 from the powdery material, in particular a powdery sorbent, storage tank 2 to the flue gas duct of the heating unit 8 and pursue downstream of the heating unit 8 by a flow of conveying fluid generated by the blower 1 and blowing conveying fluid inside said first pneumatic conveying pipeline 13 in which particles of said powdery material, in particular said powdery sorbent are transported.

The dosing means 3 doses an amount of said powdery material, in particular said powdery sorbent when entering from said powdery material, in particular said powdery sorbent storage tank 2 into said first pneumatic conveying pipeline 13.

The dosing means 3 are preferably selected from a dosing screw, a rotating valve with a vertical shaft or an horizontal shaft, an air slide, a jet feeder, a screw-feeder, an airlock-feeder, a screw pump, a pressure vessel, an air lift or the like.

The powdery material, in particular the powdery sorbent contained in the powdery material storage tank 2 is selected from the group consisting of hydrated lime, hydrated or semi-hydrated dolime, limestone, dolomite, quick lime, quick dolime, sodium carbonate or bicarbonate, sodium sesquicarbonate dihydrate (also known as Trona), halloysite, sepiolite, a carbonaceous organic compound selected from active carbon and lignite coke, fly ash or a mixture of any of these compounds.

In the illustrated embodiment, a drying device 14 is provided to dry the conveying fluid before entering in the blower 1. A cooling device 4 is also provided to cool the conveying fluid after being blown by said blower into the first pneumatic conveying pipeline 13 to further convey in the first pneumatic conveying pipeline 13 a dried conveying fluid. A mixing or connecting device 5 is also present in the process plant allowing the mixing of the conveying fluid blown by said blower 1 and the powdery material, in particular the powdery sorbent dosed by said dosing means 3.

More specifically, a mixing device comprises a first feeding tube where the conveying fluid in the first pneumatic conveying pipeline is entering a mixing chamber to which the first feeding tube is connected and a second feeding tube connected to said dosing means 3 and to said mixing chamber for feeding the powdery material. During feeding of powdery material and the conveying fluid, an homogeneous mixture of the powdery material and the blown conveying fluid is performed, which leaves the mixing chamber to pursue its transport through said first pneumatic conveying pipeline 13 to said flue gas duct in the furnace or blower 8. In the first pneumatic conveying pipeline, downwards the mixing chamber, the particles are conveyed and spread properly in the conveying fluid. The particles of the powdery material in the conveying fluid are fed in the bottom of the furnace or boiler 8, especially, in the flue gas duct.

A sonic device 12 is located or connected at any location between the blower and the flue gas duct, preferably, as shown herein, between the blower and the mixing device 5. The sonic device 12 generates sonic waves inside said first pneumatic conveying pipeline and/or up to said flue gas duct. In this illustrated preferred embodiment, the blower 1 connected to said first pneumatic conveying pipeline 13 is blowing conveying fluid inside said first pneumatic conveying pipeline 13 but also blows said conveying fluid at least partially through said sonic device 12.

In this illustrated embodiment, said dosing means 3 located between said powdery sorbent storage tank 2 and said first pneumatic conveying pipeline 13 is also contacted by sonic waves transported inside said first pneumatic 13 conveying pipeline during said transport of powdery sorbent.

By the terms "connected to", it is meant that one element is connected to another element directly or indirectly, meaning that the elements are in communication one to each other but other elements can be inserted in between.

By the terms pneumatic conveying of powdery material, it is meant within the scope of the invention pneumatic conveying by negative pressure or by positive pressure, pneumatic conveying of powdery material as a dense or strand phase or dilute phase, in particular dilute phase, in conveying fluid, or as a discontinuous phase in conveying fluid.

During pneumatic conveying of a powdery material, pressure drop fluctuations occurs at any time, very frequently and are difficult to control. The fluctuations in pressure drop may be due to a number of intrinsic factors of the pneumatic conveying process or to external event.

Such fluctuations of pressure drop are disturbing the entire pneumatic conveying of the powdery material, in particular the powdery sorbent, to be conveyed, causing different kind of perturbations. Amongst other perturbations, one can found the fact that the fluctuations in pressure drop is causing a modification of the conveying velocity of the powdery sorbent.

As explained in the beginning, powdery sorbent flows have a saltation velocity under which the powdery material, in particular the powdery sorbent, starts settling in the pneumatic conveying pipe while conveying fluid blown by blowers is given a safe nominal value of velocity, greater than the saltation velocity to prevent the powdery material, in particular the powdery sorbent, settling inside the pneumatic conveying pipe.

Indeed blowers are characterized by a curve between pressure drop and flowrate. The pressure drop is the one imposed by the plant inside which pneumatic conveying shall be performed and the characterizing curve of the blower impart a flowrate to the pneumatic conveying of the powdery material, in particular the powdery sorbent depending on the value of the pressure drop occurring inside the plant.

As soon as there is a small fluctuation in pressure drop, the pressure drop start decreasing or increasing without it being possible to control it enough quickly for non-disturbing the pneumatic conveying of the powdery material. As a consequence, for example, without again being limited thereto, when the pressure drop increases, the pneumatic velocity or flowrate of the conveying fluid is reduced causing possibly the velocity of the conveying fluid to reach a value lower than the safe nominal value velocity, causing therefore the powdery material, in particular the powdery sorbent, pneumatically conveyed to sediment inside the pneumatic conveying pipeline.

The powdery material starts therefore to accumulate inside the pneumatic conveying pipeline causing on its turn fluctuations of the pressure drop as the passing diameter of the pipeline available for pneumatic conveying is reduced, causing an increase in pressure drop having on its turn consequence on the pneumatic conveying.

As one can understand, the smallest single fluctuation in the pressure drop, which occur whatever the level of optimization of the pneumatic conveying will have strong consequence in the efficiency of the pneumatic conveying of the powdery material, in particular the powdery sorbent, inside the pneumatic conveying pipeline.

This phenomena of fluctuation is occurring in any conveying fluid when blown, but is of course further amplified when a powdery material, is conveyed as the powdery material itself cannot recover easily the right regimen of pressure drop as soon as it starts accumulating inside the pneumatic conveying pipeline.

In the process according to the present invention, the sonic device 12 generates sonic waves inside said first pneumatic conveying pipeline 13 up to said flue gas duct in the furnace or in the boiler 8 and provides a counteraction on the fluctuation step of the pressure drop in said first pneumatic conveying pipeline up to said flue gas duct.

It has been indeed surprisingly realized that when sonic waves generates an increase of pressure, the increase of pressure has the capability to counteract on the fluctuation step of the pressure drop in said first conveying pipeline and/or in said flue gas duct.

The sonic device preferably creates a pressure drop increase in the first pneumatic conveying pipeline close to the sonic generator of between 20 and 200 mbar, in particular of at least 30 mbar, in particular of at most 150 mbar.

Preferably, when said sonic device provides a counteraction on the fluctuation step of the pressure drop in said first pneumatic conveying pipeline and/or up to said recipient zone, said sonic device provides a smoothing action and/or a masking action on the fluctuation step of the pressure drop in said first pneumatic conveying pipeline and/or up to said flue gas duct.

The sonic waves are used to increase the pressure drop, meaning that the sonic waves according to the present invention are used in such a way that they are able to counteract the fluctuation step of the pressure drop, thereby minimizing perturbations causing the accumulation of powdery material, in particular powdery sorbent, in said pneumatic conveying instead of curing or retro-acting on the accumulation of particles.

In the illustrated preferred embodiment, the counteraction on the fluctuation step of the pressure drop in said first pneumatic conveying pipeline 13 causes the improvement of the polluting compounds capture by reducing fluctuations in powdery sorbent, in particular powdery mineral sorbent, fed in the flue gas duct by sonic waves transported inside said first pneumatic conveying pipeline 13 during said pneumatic conveying of powdery sorbent.

Indeed, it has been found surprisingly that sonic waves transported inside said first pneumatic conveying pipeline during said pneumatic conveying of powdery sorbent has a direct impact on fluctuations in pneumatic conveying of powdery sorbent fed in the flue gas duct.

The appropriated use of circulating sonic waves, creating an increase of the pressure drop inside said first pneumatic conveying pipeline 13 during said transport of powdery sorbent, can solve the fluctuations in the powdery material, in particular the powdery sorbent injected inside the flue gas duct.

The sonic waves transported inside said first pneumatic conveying pipeline during said transport of powdery sorbent have been shown to prevent deficiencies in the pollutants capture inside the flue gas duct by counteracting very quickly on fluctuations in the pressure drop, thereby preventing particles not having enough speed to settle and enabling them to be conveyed by the pneumatic transport and as a consequence to still reach the flue gas duct. Indeed, sonic waves are colliding with the particles having a tendency to settle against the wall of the first pneumatic conveying pipeline when they did not have enough speed to be pneumatically conveyed as a result of the existence of boundary layer.

Indeed, the combination of the proper use of the sonic waves creating an increase of pressure drop in the first pneumatic conveying pipeline together with the collision between the particles of the powdery sorbent and the sonic waves having fluctuating frequency of the waves that change the location of the antinodes and the vibration nodes of the sound in the pipe.

Therefore, according to the present invention, the sonic waves transported inside said first pneumatic conveying pipeline 13 during said conveying of powdery sorbent have been shown to improve the level of pollutants capture by counteracting fluctuations in the pressure drop in the first pneumatic conveying pipeline 13 and thereby ensuring adequate/optimizing flowrate of powdery sorbent to the flue gas duct in the furnace or boiler 8.

In some cases, fluctuations of pressure drop in the first pneumatic conveying pipeline are due to the operating conditions or to regulation loop due to a first signal given by the process in itself or by a measure or a data.

More and more, burning industries use analyzer at the exit of the flue gas duct to measure level of polluting compounds (example of first signal) and have put in place over time regulation loop in order to retroact on the amount of powdery sorbent used to capture those pollutants. For example, if the level of $SO_2$ starts to increase, the amount of powdery sorbent will be increased to improve the capture of this pollutant. If the level of $SO_2$ starts to decrease, the amount of powdery sorbent will be decreased.

Other "burning industries" are not using continuous analysis but as a precautionary measure, they adjust the amount of powdery sorbent based on several criteria and measurement (first signal), such as the level of sulfur in the fuel which will be used, pre-analysis or data regarding the level of chloride or sulfur present in the garbage to be burned or the material to be heated (metal ore, recycling material . . . ), based on the combustion or the heating step, the turnaround of people conducting the furnace, the primary air level introduced in the furnace to do the combustion of the material to be burned, based on temperature, atmospheric pressure, . . . . The amount of powdery sorbent is then fixed manually for a predetermined period of time and changed when a new condition (first signal) arises.

More particularly, when a first signal arises from exhaust gases from the combustion of fuel and/or material to be burned, such as an increase in pollutants level, a decrease of pollutants level, the response to be given is to change the amount of powdery sorbent to be introduced inside the flue gas duct. The change in the amount of powdery sorbent which is blown inside the first pneumatic conveying pipeline by the blower yields to a change in the weight ratio between said conveying fluid and said powdery sorbent which creates fluctuations in the pressure drop of the pneumatic transport, thereby causing fluctuations in the powdery material, in particular the powdery sorbent injected inside the flue gas duct.

Indeed, the change in the amount of powdery sorbent causes fluctuations in the operating of the pneumatic conveying system causing itself fluctuations of the conveying fluid flow rate to adapt itself to the counter-pressure as the blowing rate stays quite stable at the exit of the blower in the first pneumatic conveying pipeline.

In response to a first signal, changes occur in the weight ratio between said powdery sorbent and said conveying fluid. The particles of the powdery sorbent are conveyed with fluctuating speed in the first pneumatic conveying pipeline which can increase or decrease.

In other cases, said first signal is such as wind speed of environment at the outlet of the chimney, atmospheric pressure of environment at the outlet of the chimney or outside said flue gas duct, temperature of the flue gas, nature of the fuel, sulfur content of the fuel, sulfur content of the flue gas, chloride content of the flue gas, mercury content of the flue gas, chloride content of material to be burned, sulfur content of material to be burned or to be heated, mercury content of material to be burned or to be heated, and their combination.

Figure 1B:
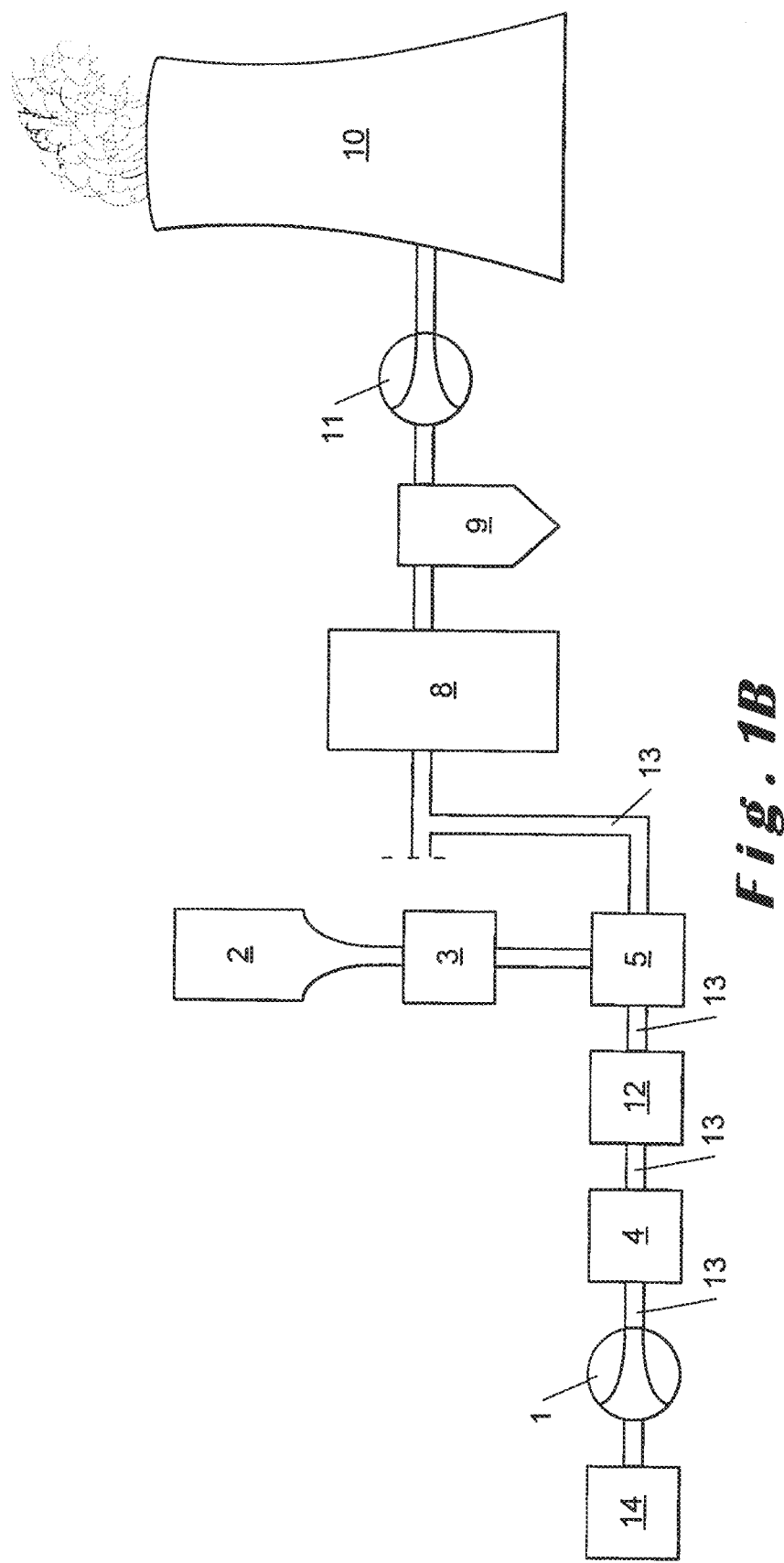

FIG. 1B illustrates a variant embodiment according to the present invention, where the particles of the powdery material in the conveying fluid are fed in a duct entering the heating unit 8.

Figure 1C:
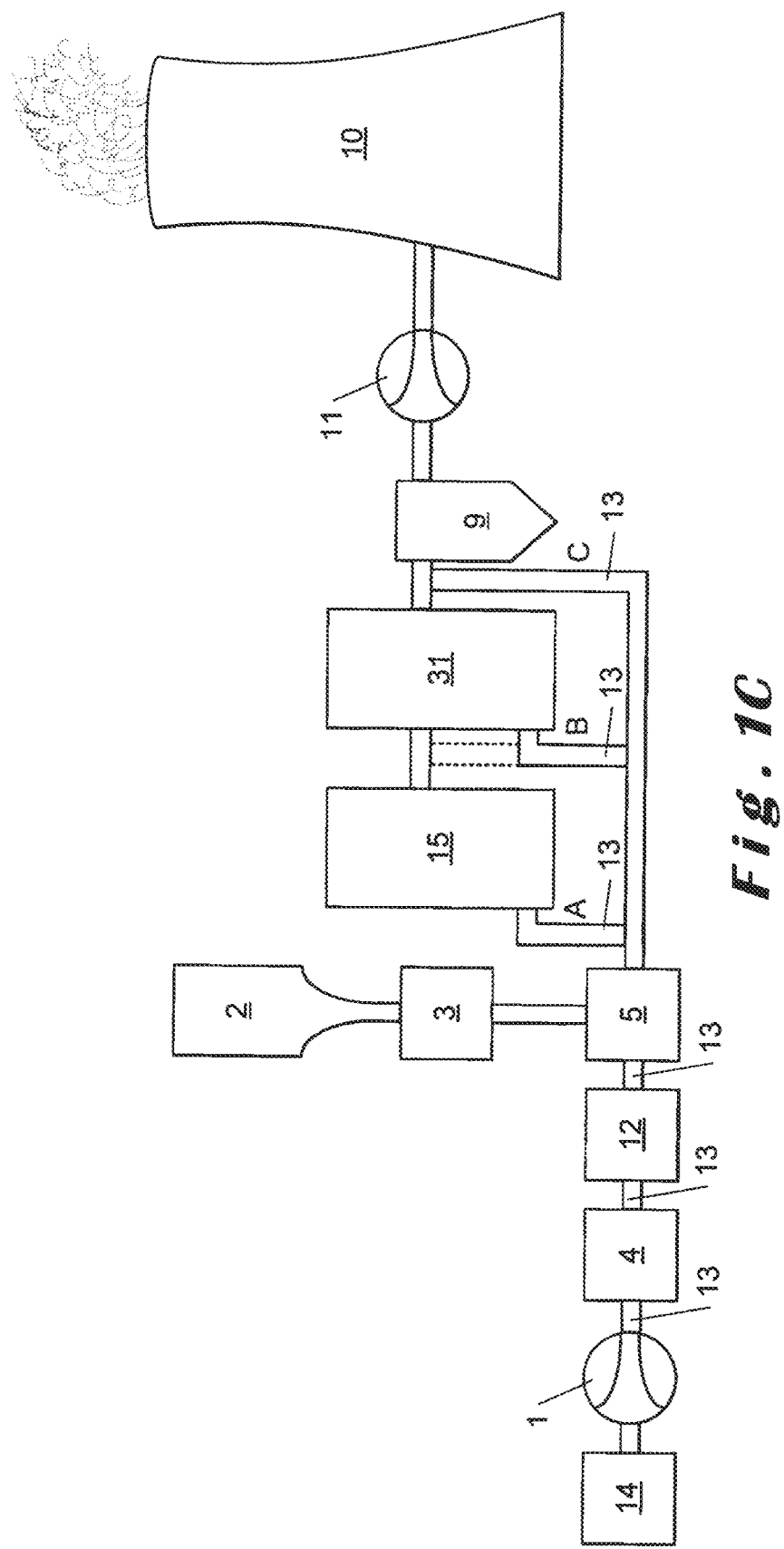

FIG. 1C, as mentioned earlier, illustrates a process where the heating process comprises a boiler 31 recovering heat energy from a furnace or from a burner 15.

Hot flue gases are produced more specifically in the furnace or burner 15 and are conveyed to a boiler 31 for recovering the contained calories, before being transferred to a filtering device and/or a gas scrubber 9. It is obvious that even if only one item is represented as equipment 9, there can be consecutive filter and scrubber units, in whatever order, connected by a duct, depending of the flue gas treatment facility of the plants.

The powdery material can be injected as illustrated in different locations, such as in the furnace 15, including in its after combustion chamber or post-combustion zone (option A), in the boiler 31 (option B), or at the entrance of the filtering device and/or gas scrubber 9 (option C) or in the gas duct in between all those equipment (dashed line) or any combination thereof. It is obvious that in case of multiple equipment 9, the powdery material can be injected in between the various equipment 9, in the duct between or at the entrance of one or more of the units 9.

The first pneumatic conveying pipeline shall be depending on the several options connected to the furnace or its after combustion chamber or post-combustion zone (option A), to the boiler (or any other heat exchanger) 31 (option B), or to the filtering (or scrubbing) device 9 (option C) or in the gas duct in between all those equipment or any combination thereof.

In a specific variant according to the present invention, it is also foreseen that multiple conveying pipelines are present, each containing their own sonic device or even that downstream of the sonic device a multiway connector is present and the first multiple conveying pipeline is spread into a bundle of pneumatic conveying pipelines, optionally provided with a closing/opening mechanism to provide more flexibility to the device according to the present invention.

FIG. 10D represent the embodiment A illustrated in FIG. 1C where the sonic device generating sonic waves being an infrasound device generating infrasonic waves is detailed. It is to be noted that the sonic device can be integrated in both variants B and C.

In the infrasound device, infrasonic waves are generated inside an infrasound device 12 comprising a first chamber 16 and a second chamber 17, both first and second chamber being connected to each other by a tube 18, said infrasonic waves being generated by an exciter 19 inside the first chamber 16 providing infrasound pulses to said conveying fluid blown at least partially inside said first chamber 16, said generated infrasonic waves being transported through the tube to reach the second chamber 17 wherein the first chamber is divided into a first compartment 20 and a second compartment 21. The first compartment 20 is connected to the second compartment 21 through a passing hole 22 and comprises an internal channel inside which a moving piston is moved from a first position to a second position and from said second position to said first position by a power source 23, located externally with respect to the first chamber 16 and forming the exciter. The internal channel is concentrically installed inside said first compartment 20.

Infrasonic waves are generated by the moving piston and transported by said conveying fluid from said first compartment 20 to said second compartment 21, through the passing hole 22 before being transported through the tube 18 to reach the second chamber 17.

The conveying fluid blown by said blower 1 reaches the first compartment of the first chamber to enter the infrasound device through feed line 24. The first chamber 16 is followed by a tapered section 16a to the connection with the tube acting as a resonance tube 18. The conveying fluid follows the tube 18 to reach a second expansion tapered section 17a having a widening section in the direction of the second chamber 17 to which it is connected.

In a preferred embodiment, further comprising an adjustable flowrate distributor pipe 25 connected at a first end either to the blower 1, between the blower 1 and the first chamber 16 or to the first chamber 16, preferably to the first compartment 20 and at a second end to the second chamber 17. Said adjustable flowrate distributor pipe 25 is provided for deriving a portion of said conveying fluid blown by the blower 1 and introducing it inside the second chamber 17.

In another preferred embodiment, the device according to the present invention further comprises an Helmholtz bass trap (not illustrated) connected to said first chamber 16 or preferably on the pipeline between the blower and the first chamber. The Helmholtz bass trap is provided to prevent infrasonic waves transported inside said first pneumatic conveying pipeline 13 during said transport of powdery sorbent to reach the blower 1.

Figure 1D:
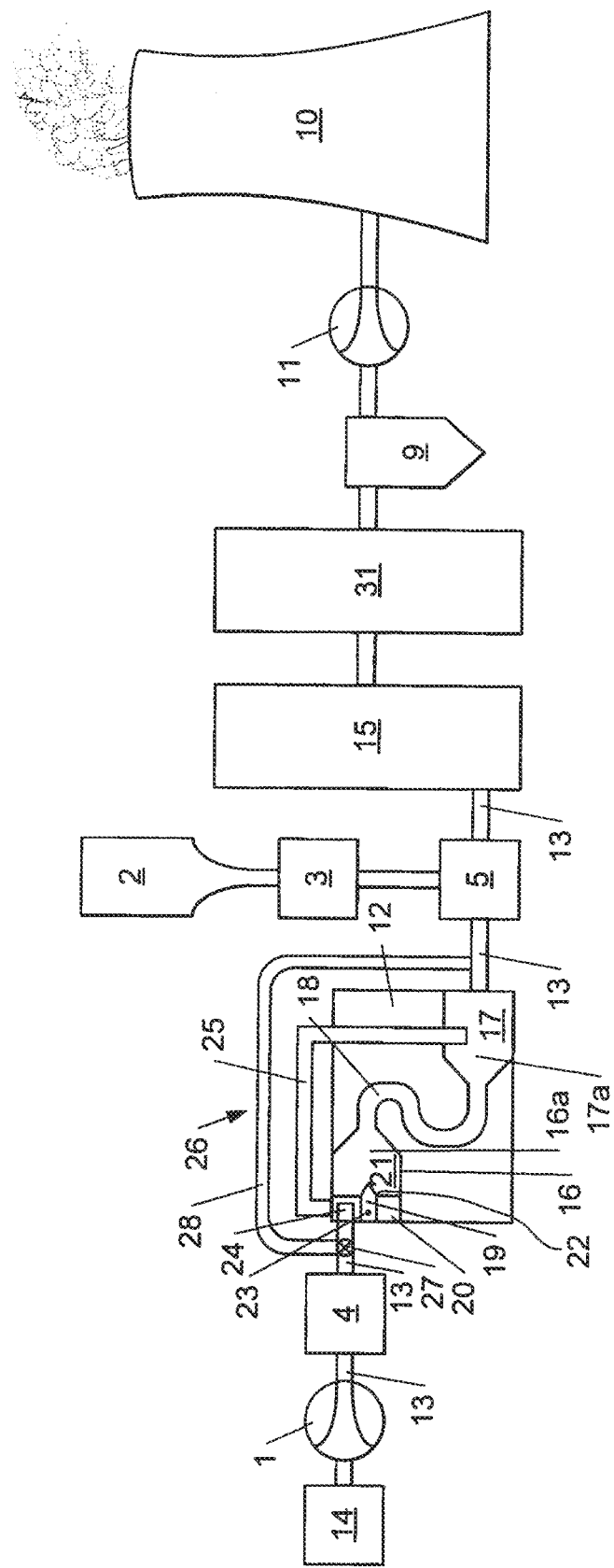

In another preferred embodiment as shown in FIG. 1D, the device according to the present invention comprises an emergency device 26 having a first position being an emergency position and a second position being an operating position, said emergency device comprising a switch 27 connected to an emergency pipe 28 connecting directly the blower 1 to the first pneumatic conveying pipeline 13, downstream the infrasound device 12. The switch 27 can be a 3-Way valve installed in connection point as drawn and so all the blown conveying fluid go through emergency pipe 28 or can be a 2-ways valve inserted in any position in pipe 28 allowing the blown conveying fluid to be conveyed (totally or partially depending of the position of the moving piston in the internal channel) downstream the infrasound device 12.

The emergency position being a position wherein the switch 27 prevents the blown conveying fluid from entering said first chamber 16 and diverting it directly to said first pneumatic conveying pipeline 13, downstream the infrasound device 12 and wherein the operating position is a position wherein the blown conveying fluid is provided at least partially to said first chamber 16.

The infrasonic device operates at low pressure, meaning that the pressure inside the infrasonic device is oscillating around the atmospheric pressure but stays lower that 1.5 absolute bar.

The generated infrasonic waves are high power waves between 150 and 170 dB. The entering conveying fluid is fed at a pressure around 1.25 bar. The piston 23 propels the conveying fluid from the entry for the conveying fluid 24. The power source drives the piston for ensuring its movement. The preferred diameter of the piston is comprised between 50 and 150 mm. The piston moves from a first position to a second position inside a jacket connected to the first compartment 20. The Jacket comprises holes of a first type allowing the jacket to be in fluid connection with the conveying fluid entry 24. In addition, the piston 23 comprises a head also provided with holes of a second type.

The jacket is located inside a the first compartment 20 in fluid connection with the conveying fluid entry 24. During the displacement of the piston 23 from the first position to the second position, the holes of the second type moves gradually in front of the holes of the first type, allowing gradually the conveying fluid to travels from the first compartment 20 to the second compartment 21. When the piston 23 is in the first position, the holes of the first type co-channel with the holes of the second type, fully allowing the passage of the conveying fluid (open position). When the piston 23 is in the second position, the holes of the first type does not co-channel with the holes of the second type, preventing therefore the passage of the conveying fluid (closing position).

The generator of infrasonic pulses generates downstream the oscillation of the conveying fluid at a sonic frequency, which is in the case of infrasonic waves, lower than 30 Hz, preferably around 20 Hz. The generation of the pulse, i.e. the moving of the piston 23 generates a fluctuation of the pressure in the conveying fluid at a sonic frequency which propagates through the piping of the device.

The first chamber causes a reduction of the power of the oscillations, but increases the bandwidth. Indeed, because a resonance tube is provided, the frequency may vary from +0.5 to −0.5 Hz which changes the location of the antinodes and the vibration nodes of the sound in the first pneumatic conveying pipeline.

Preferably the diameter of the basis of the tapered section 16a is comprised between 350 to 500 mm and the diameter of the top of the tapered section 16a is comprised between 150 and 219 mm. The resonance tube 18 has a diameter comprised between 150 and 300 mm and a length of X/4 where X is the wavelength of the infrasonic signal. The resonance tube 18 allow the conveying fluid to start resonance. The basis of the tapered section 17a is comprised between 150 and 300 mm and the top of the tapered section 17a has a diameter comprised between 400 and 600 mm. The second chamber 17 allows to propagate the oscillations for ensuring the transmission to the powdery material. The length of the second chamber 17 is about 750 mm and the diameter is comprised between 400 and 600 mm.

Figure 2:
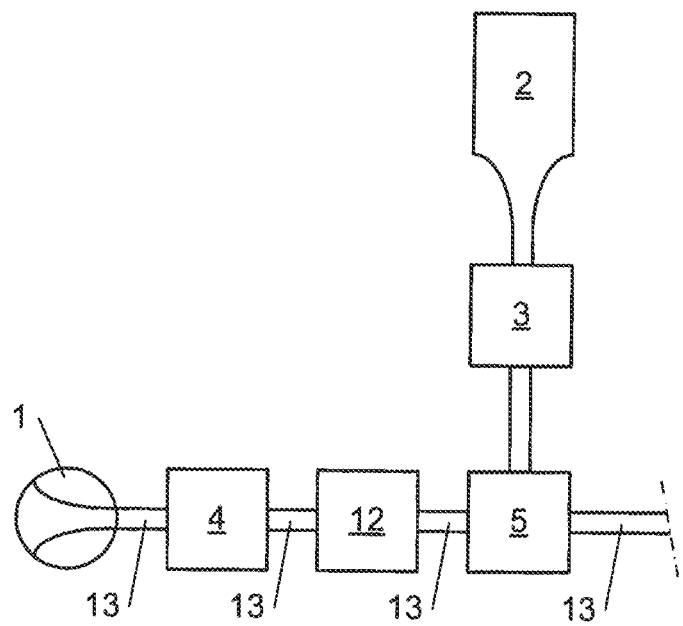
FIG. 2 is a schematic representation of a pneumatic conveying of a powdery material, where the sonic device is located in line with the pneumatic conveying pipeline.
Figure 3:
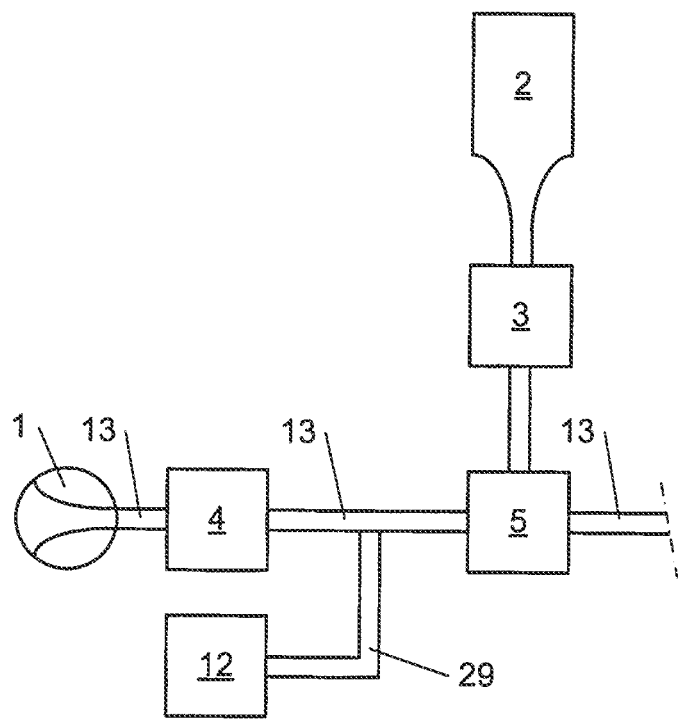
FIG. 3 is a schematic representation of a pneumatic conveying of a powdery material, where the sonic device is located in parallel with the pneumatic conveying pipeline.
Figure 4:
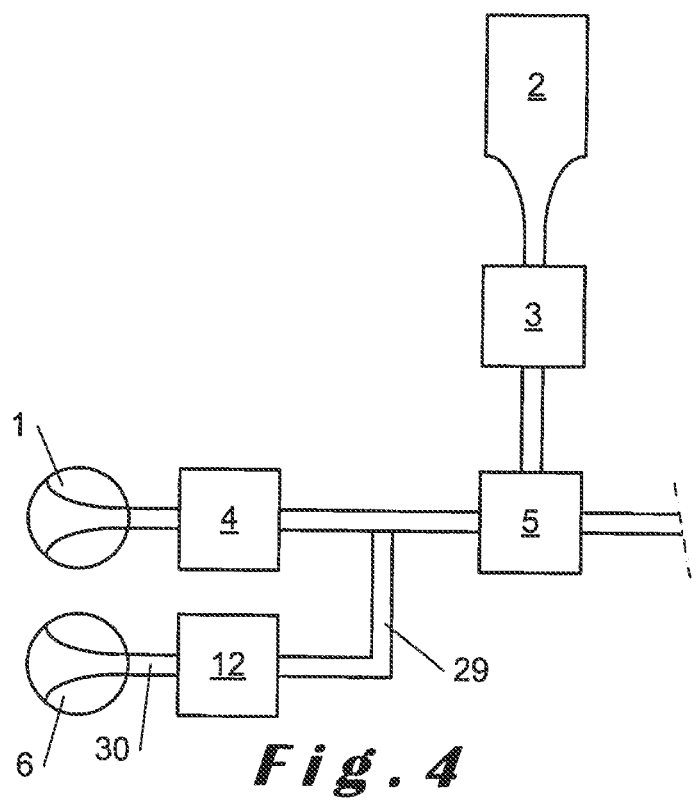
FIG. 4 is a schematic representation of a pneumatic conveying of a powdery material, where the sonic device is located in parallel with its own blower with the pneumatic conveying pipeline.

FIGS. 2 to 4 illustrate, without being limited thereto preferred location of the sonic device in a pneumatic conveying system.

In other embodiment, the sonic device can also be located downstream the storage tank In those embodiment illustrated in FIG. 2 to 4, the first pneumatic conveying pipeline can be connected to, as in FIGS. 1A to 1D to a furnace, an incinerator, a boiler, a filter, a scrubber or even to a silo. This has been mentioned in the following a recipient zone.

According to the present invention, by the terms recipient zone, it is meant a silo for collecting the powdery sorbent, a channel where the powdery material, in particular the powdery sorbent shall be injected through pneumatic conveying, such as a flue gas duct, a pipeline inside a plant, gas scrubbers, filters devices, such as electrostatic precipitator, bag filters, . . . .

FIG. 2 illustrates schematically a pneumatic conveying system to convey a powdery material, for example a powdery sorbent.

The pneumatic conveying system comprises a blower 1 is connected to a first pneumatic conveying pipeline 13 and blows conveying fluid, such as for example air, inert gas, exhaust gases, or mixture thereof in the first pneumatic conveying pipeline 13.

A powdery material, in particular a powdery sorbent storage tank 2 is connected to the first pneumatic conveying pipeline 13 through a dosing means 3. The first pneumatic conveying pipeline 13 comprising a pipeline wall is connected to said powdery material, in particular said powdery sorbent storage tank 2 and the recipient zone The conveying fluid has a flow comprising boundary layer along said pipeline wall, but also the particles of said powdery material have a boundary layer around them inside said conveying flow.

The powdery material, in particular the powdery sorbent is therefore pneumatically conveyed in the first pneumatic conveying pipeline 13 from the powdery material, in particular a powdery sorbent storage tank 2 to the flue gas duct in the recipient zone (not illustrated) by a flow of conveying fluid generated by the blower 1 and blowing conveying fluid inside said first pneumatic conveying pipeline 13 in which particles of said powdery material, in particular said powdery sorbent are transported.

The dosing means 3 doses an amount of said powdery material, in particular said powdery sorbent when entering from said powdery material, in particular said powdery sorbent storage tank 2 into said first pneumatic conveying pipeline 13.

The dosing means 3 are preferably selected from a dosing screw, a rotating valve with a vertical shaft or an horizontal shaft, an air slide, a jet feeder, a screw-feeder, an airlock-feeder, a screw pump, a pressure vessel, an air lift.

The powdery material, in particular the powdery sorbent contained in the powdery material storage tank 2 is selected from the group consisting of hydrated lime, hydrated or semi-hydrated dolime, limestone, dolomite, quick lime, quick dolime, sodium carbonate or bicarbonate, sodium sesquicarbonate dihydrate (also known as Trona), halloysite, sepiolite, a carbonaceous organic compound selected from active carbon and lignite coke, fly ash or a mixture of any of these compounds.

In the illustrated embodiment, a drying device 4 is also provided to dry the conveying fluid after being blown by said blower to in the first pneumatic conveying pipeline 13 to further convey in the first pneumatic conveying pipeline 13 a dried conveying fluid. A mixing or connecting device 5 is also present in the process plant allowing the mixing of the conveying fluid blown by said blower 1 and the powdery material, in particular the powdery sorbent dosed by said dosing means 3.

More specifically, the mixing device comprises a first feeding tube where the conveying fluid in the first pneumatic conveying pipeline is entering a mixing chamber to which the first feeding tube is connected and a second feeding tube connected to said dosing means 3 and to said mixing chamber for feeding the powdery material. During feeding of powdery material and the conveying fluid, an homogeneous mixture of the powdery material and the blown conveying fluid is performed, which leaves the mixing chamber to pursue its transport through said first pneumatic conveying pipeline 13 to said recipient zone. In the first pneumatic conveying pipeline, downwards the mixing chamber, the particles are conveyed and spread properly in the conveying fluid.

A sonic device 12 is located or connected at any location between the blower and the flue gas duct, preferably, as shown herein, between the blower and the mixing device 5. The sonic device 12 generates sonic waves inside said first pneumatic conveying pipeline and/or up to said recipient zone. In this illustrated preferred embodiment, the blower 1 connected to said first pneumatic conveying pipeline 13 is blowing conveying fluid inside said first pneumatic conveying pipeline 13 but also blows said conveying fluid at least partially through said sonic device 12.

In this illustrated embodiment, said dosing means 3 located between said powdery material storage tank 2 and said first pneumatic conveying pipeline 13 is also contacted by sonic waves transported inside said first pneumatic 13 conveying pipeline during said transport of powdery material.

By the terms "connected to", it is meant that one element is connected to another element directly or indirectly, meaning that the elements are in communication one to each other but other elements can be inserted in between.

By the terms pneumatic conveying of powdery material, it is meant within the scope of the invention pneumatic conveying by negative pressure or by positive pressure, pneumatic conveying of powdery material as a dilute phase in conveying fluid, or as a discontinuous phase in conveying fluid.

During pneumatic conveying of a powdery material, pressure drop fluctuations occurs at any time, very frequently and are difficult to control. The fluctuations in pressure drop may be due to a number of intrinsic factor of the pneumatic conveying process or to external event.

Such fluctuations of pressure drop are disturbing the entire pneumatic conveying of the powdery material to be convey causing different kind of perturbations. Amongst other perturbations, one can found the fact that the fluctuations in pressure drop is causing a modification of the conveying velocity of the powdery material.

As explained in the beginning, powdery material flows have a saltation velocity under which the powdery material, in particular the powdery sorbent start settling in the pneumatic conveying pipe while conveying fluid blown by blowers are given a safe nominal value of velocity, greater than the saltation velocity to prevent the powdery material, in particular the powdery sorbent settling inside the pneumatic conveying pipe.

Indeed blowers are characterized by a curve between pressure drop and flowrate. The pressure drop is the one imposed by the plant inside which pneumatic conveying shall be performed and the characterizing curve of the blower impart a flowrate to the pneumatic conveying of the powdery material, in particular the powdery sorbent depending of the value of the pressure drop occurring inside the plant.

As soon as there is a small fluctuation in pressure drop, the pressure drop start decreasing and increasing without it being possible to control it enough quickly for non-disturbing the pneumatic conveying of the powdery material. As a consequence, for example, without again being limited thereto, when the pressure drop increases, the pneumatic velocity or flowrate of the conveying fluid is reduced causing possibly the velocity of the conveying fluid to reach a value lower than the safe nominal value velocity, causing therefore the powdery material, in particular the powdery sorbent pneumatically conveyed to sediment inside the pneumatic conveying pipeline.

The powdery material starts therefore to accumulate inside the pneumatic conveying pipeline causing on its turn fluctuations of the pressure drop as the passing diameter of the pipeline available for pneumatic conveying is reduced, causing an increase in pressure drop having on its turn consequence on the pneumatic conveying.

As one can understand, the smallest single fluctuation in the pressure drop, which occur whatever the level of optimization of the pneumatic conveying will have strong consequence in the efficiency of the pneumatic conveying of the powdery material, in particular the powdery sorbent inside the pneumatic conveying pipeline.

This phenomena of fluctuation is occurring in any conveying fluid when blown, but is of course further amplified when a powdery material, is conveyed as the powdery material itself cannot recover easily the right regimen of pressure drop as soon as it starts accumulating inside the pneumatic conveying pipeline.

In the process according to the present invention, the sonic device 12 generates sonic waves inside said first pneumatic conveying pipeline 13 up to said recipient zone and provides a counteraction on the fluctuation step of the pressure drop in said first pneumatic conveying pipeline up to said recipient zone.

It has been indeed surprisingly realized that when sonic waves generates an increase of pressure, the increase of pressure has the capability to counteract on the fluctuation step of the pressure drop in said first conveying pipeline and/or in said recipient zone.

The sonic device preferably creates a pressure increase in the first pneumatic conveying pipeline close to the sonic generator of between 20 and 200 mbar, in particular of at least 30 mbar preferably of at most 150 mbar.

Preferably, when said sonic device provides a counteraction on the fluctuation step of the pressure drop in said first pneumatic conveying pipeline and/or up to said recipient zone, said sonic device provides a smoothing action and/or a masking action on the fluctuation step of the pressure drop in said first pneumatic conveying pipeline and/or up to said recipient zone.

The sonic waves are used to increase the pressure drop, meaning that the sonic waves according to the present invention are used in such a way that they are able to counteract the fluctuation step of the pressure drop, thereby minimizing perturbations causing the accumulation of powdery material in said pneumatic conveying instead of curing or retro-acting on the accumulation of particles.

In the illustrated preferred embodiment, the counteraction on the fluctuation step of the pressure drop in said first pneumatic conveying pipeline 13 causes the improvement of the pollutant compounds capture by reducing fluctuations in powdery material, in particular powdery mineral material, fed in the flue gas duct by sonic waves transported inside said first pneumatic conveying pipeline 13 during said pneumatic conveying of powdery material.

Indeed, it has been found surprisingly that sonic waves transported inside said first pneumatic conveying pipeline during said pneumatic conveying of powdery material has a direct impact on fluctuations in pneumatic conveying of powdery material fed in the recipient zone.

The appropriated use of travelling sonic waves, creating an increase of the pressure drop inside said first pneumatic conveying pipeline 13 during said transport of powdery material, can solve the fluctuations in the powdery material, in particular the powdery sorbent injected inside the recipient zone.

The sonic waves transported inside said first pneumatic conveying pipeline during said transport of powdery material have been shown to prevent deficiencies in the pollutants capture inside the flue gas duct by counteracting very quickly on fluctuations in the pressure drop, thereby preventing particles not having enough speed to settle and enabling them to be conveyed by the pneumatic transport and as a consequence to still reach the flue gas duct. Indeed sonic waves are colliding with the particles having a tendency to settle against the wall of the first pneumatic conveying pipeline when they did not have enough speed to be pneumatically conveyed as a result of the existence of boundary layer.

Indeed, the combination of the proper use of the sonic waves creating an increase of pressure drop in the first pneumatic conveying pipeline together with the collision between the particles of the powdery material and the sonic waves having fluctuating frequency of the waves that change the location of the antinodes and the vibration nodes of the sound in the pipe.

FIG. 3 illustrates another possible location of a sonic device in a pneumatic conveying system according to the present invention.

As it can be seen, in this embodiment, the sonic device is not located in the first pneumatic conveying pipeline 13 but instead is placed in parallel and is connected to the first pneumatic conveying pipeline 13 through an exit duct 29 reaching the first pneumatic conveying pipeline before the mixing device. The sonic device is a dead-end device.

FIG. 4 illustrates another possible location of a sonic device in a pneumatic conveying system according to the present invention.

As it can be seen, in this embodiment, the sonic device is not located in the first pneumatic conveying pipeline 13 but instead is placed in parallel and is connected to the first pneumatic conveying pipeline 13 through an exit duct 29 reaching the first pneumatic conveying pipeline before the mixing device. The sonic device 12 is a blow through device and is connected by an entry duct 30 to another blower 6.

Figure 4A:
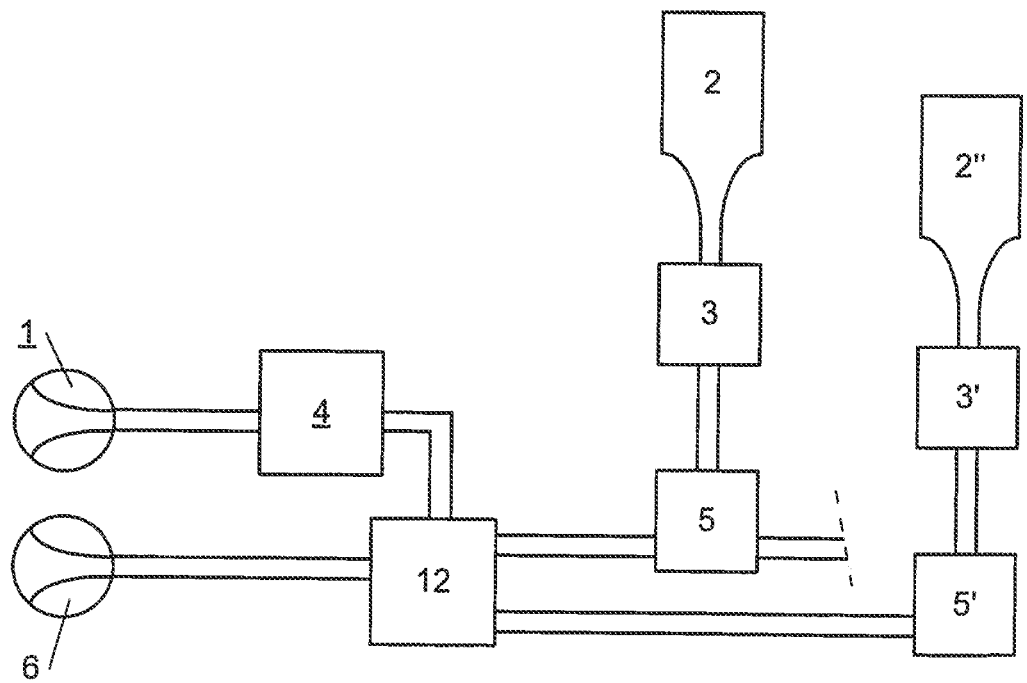
FIG. 4A is a schematic representation of a multilines pneumatic conveying of a powdery material.

FIG. 4A is showing a multiline pneumatic conveying system wherein one sonic device 12 is located upstream of the dosing means 5 of both illustrated pneumatic conveying pipelines.

Figure 5:
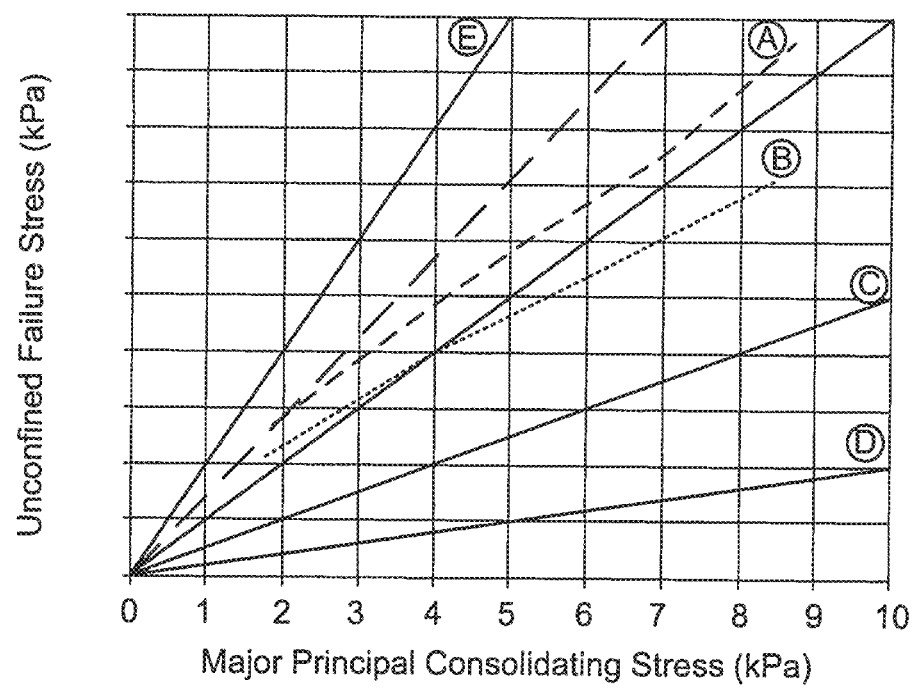
FIG. 5 is a Jenicke flow diagram for powdery material showing the cohesive behavior of the powdery material when it is hydrated lime.

FIG. 5 is a Jenicke flow diagram for powdery material showing the cohesive behavior of the powdery material when it is hydrated lime.

As it has been said previously, the problem of adhesion to solid objects is increasingly important for particles of decreasing particle diameter because of the increased contribution of electrostatic forces in comparison with friction, impulse and gravitation forces.

Hydrated lime particles with diameter (<100 μm) are generally classified as cohesive according to the Geldart classification and their flow properties can be evaluated in detail using the flow function classification according to Jenicke.

With the Jenicke flow function the internal cohesion of the powder is measured and this can be regarded as a good indicator for the adhesion properties of a powder.

In FIG. 5, the cohesiveness of two hydrated lime powders are shown. Powder A has a particle size of $d_\rho=10$ (μm) while Powder B has a particle size of $d_\rho=3$ (μm). It is clear that Power 8 is more cohesive and is classified by the flow function by "very cohesive". As a result, Powder B, will be much more sensitive to adhesion to rigid pipe walls than Powder A. Powder C is an easy flowing powder, Powder D is a free flowing powder, while powder E is a sticky powder.

EXAMPLE

Tests have been performed on an industrial scale, in a power plant, to evaluate the effects of the present invention for pneumatically conveying of powdery hydrated lime sorbent, notably in terms of the fluctuation of the pressure drop inside the plant.

Figure 7:
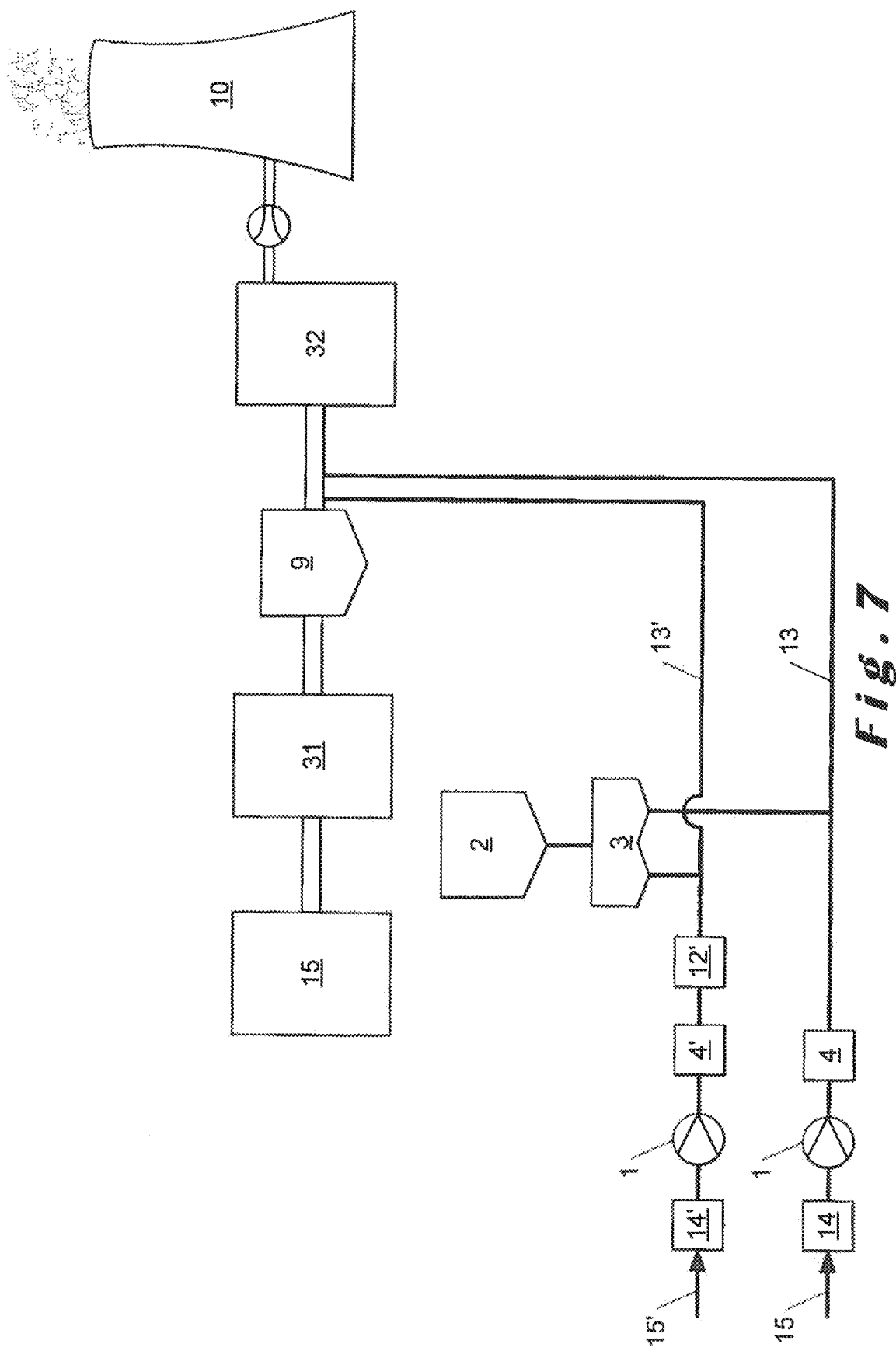
FIG. 7 illustrates schematically the plants where the example was carried out.

The power plant used in these tests, which is illustrated in FIG. 7, comprises a burner (15), a furnace (31) for burning coal, said furnace being connected to a flue gas duct wherein flue gases generated in said furnace are directed to an electrostatic precipitator (9), followed by a scrubber (32) and further evacuated to a chimney (10).

The hydrated lime is injected into the flue gas duct of this power plant, before the electrostatic precipitator and before the chimney, for capturing gaseous pollutants, in particular $SO_2$. Such sorbent is a high specific surface area hydrated lime, as disclosed in WO9714650.

The plant further comprises a storage tank (2) for said powdery hydrated lime, said tank being connected to the furnace through a hopper (3) having two outputs for directing said powdery hydrated lime in parallel into two pneumatic conveying pipelines (13, 13') at an identical feedrate. The conveying pipelines (13, 13') both present a diameter of 4 inche (10.2 cm). The feedrate of hydrated lime is periodically adjusted, based on the quantity of coal burned in the furnace and on the amount of sulfur contained therein.

Both conveying pipelines are supplied by blowers (1, 1') with air (15, 15') as conveying fluid.

Those conveying fluids (15, 15') are first dried by drying devices (14, 14') before entering the blowers (1, 1') and then further cooled by cooling devices (4, 4') after being blown by the blowers. The blowers (1,1') present an initial pressure drop fixed at about 10 kPa.

In order to illustrate the present invention, the conveying fluid (15') is further transferred into a sonic device (12'), as previously described, before being in contact with hydrated lime.

The pressures drops in both conveying pipelines (13, 13') are continuously measured by the blowers (1, 1').

Consequently, with this plant, it is possible to compare in real time the fluctuation of pressure drop, notably generated by the variation overtime of the feedrate of hydrated lime injection, in a conveying pipeline where no sonic device has been implemented, compared to a conveying pipeline according to the present invention comprising a sonic device, as previously described.

Figure 6:
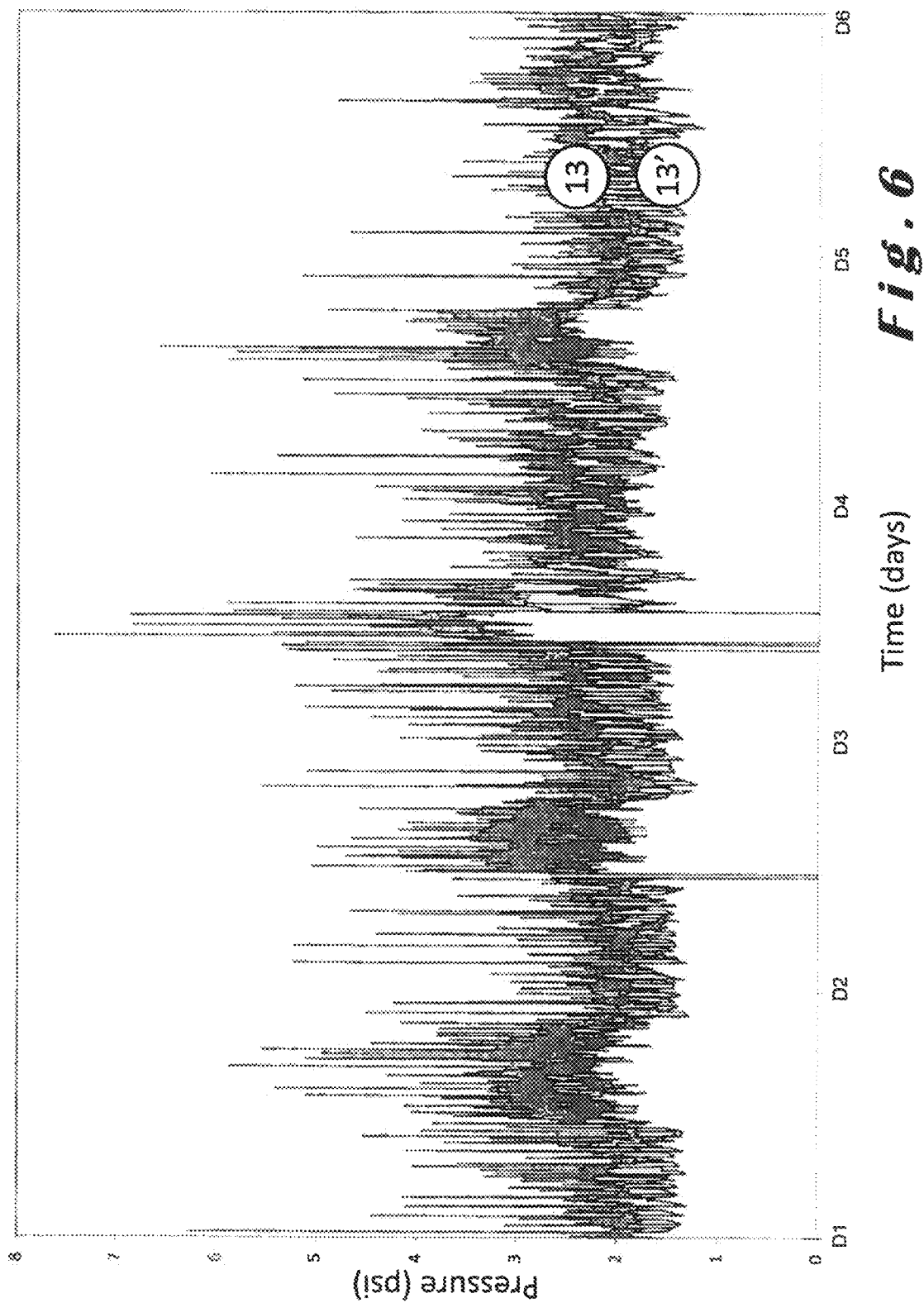
FIG. 6 is a graph showing the pressure trends in the first pneumatic conveying pipeline where the first curve shows the pressure drop over time in one pneumatic conveying pipeline 13' without an infrasound device and the second curve shows the pressure drop over time in another pneumatic conveying pipeline 13 without infrasound device.
Figure 6A:
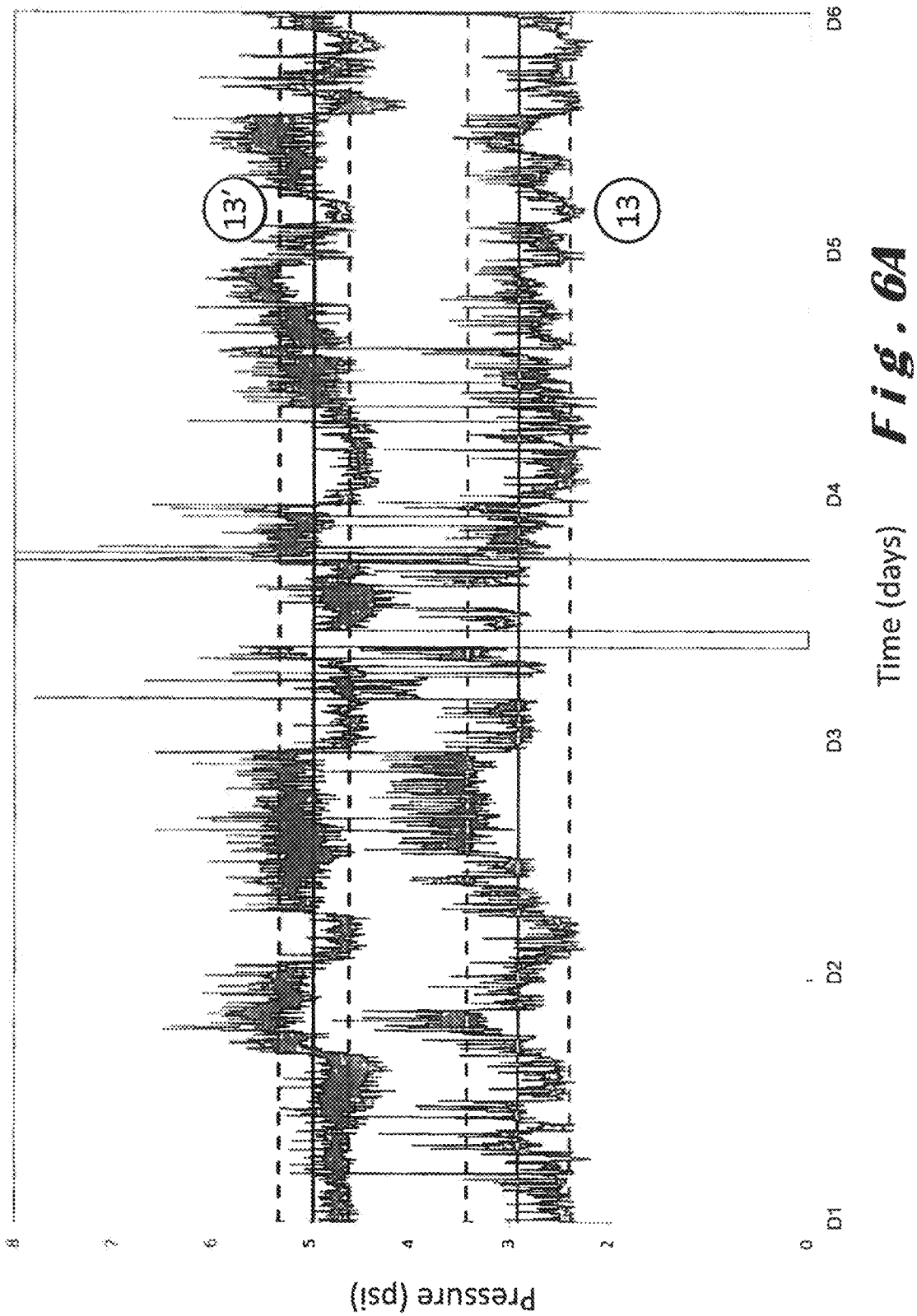
FIG. 6A is a graph showing the pressure trends in the first pneumatic conveying pipeline where the first curve shows the pressure drop over time in one pneumatic conveying pipeline 13' WITH an infrasound device and the second curve shows the pressure drop over time in another pneumatic conveying pipeline 13 without infrasound device.

The results are illustrated in FIGS. 6 and 6A.

FIG. 6 shows the pressure in the lines measured as a function of time for a period of five consecutive days of operation. FIG. 6 represents the reference case i.e. the sonic device is not in operation and the conditions for lines 13' and 13 are similar. It is clear from FIG. 6 that large fluctuations occur in the pressure readings and that these pressure fluctuations are similar for both line 13' and 13. Table 1 shows a statistical analysis of the pressure readings of FIG. 6.

TABLE 1

Statistical analysis of the pressure signals of lines 13' and 13 with the sonic device not in operation.

|  | Line 13' Without Sonic | Line 13 Without Sonic |  |
| --- | --- | --- | --- |
| Average Pressure | 1.82 | 2.43 | (PSI) |
| Pressure fluctuations | 0.54 | 0.53 | (PSI) |
| Relative pressure fluctuation | 29.6 | 21.7 | (%) |

We can conclude from Table 1 that both lines 13' and 13 are operating at similar average pressure with line 13' operating at a lower average pressure. The pressure fluctuation of the two lines is represented in Table 1 as the standard deviation (1σ) of the pressure signal. It is clear that the pressure fluctuation is virtually identical for the two lines. This means that, with the sonic device not in operation, the pressure loss and the variation in pressure is similar. Finally we represent the relative pressure fluctuation in Table 1 which is the ratio of standard deviation and average pressure. Since the average pressure in line 13' is a little lower, the relative effect of the pressure fluctuations is a little higher. The relative pressure fluctuation is 22-30% in the two lines. Such variation of pressure is very significant and will generate variations in the gas flow rate of the pneumatic conveying system. Note that the reported pressure fluctuation is an average number for the whole five days of operation, the instantaneous pressure fluctuations are significantly larger.

FIG. 6A shows the pressure signal of lines 13' and 13 in the case the sonic device is in operation in line 13' over a period of five days. It is evident that the pressure in line 13' is significantly higher than in line 13. Apparently operating line 13' with the sonic device generates a higher pressure loss. Note that in the case of operation without sonic device line 13' showed a slightly lower pressure than line 13, see FIG. 6. A statistical analysis of the pressure signal of FIG. 6A is given in Table 2.

TABLE 2

Statistical analysis of the pressure signals of lines 13' and 13 with the sonic device in operation.

|  | Line 13' With Sonic | Line 13 Without Sonic |  |
|---|---|---|---|
| Average Pressure | 4.96 | 2.91 | (PSI) |
| Pressure fluctuations | 0.35 | 0.51 | (PSI) |
| Relative pressure fluctuation | 7.0 | 17.7 | (PSI/PSI) |

First, Table 2 shows that the average pressure is nearly a factor of two (1.7) higher in the line with the sonic device in operation (13') than in the line without sonic device (13). The pressure fluctuations, represented in Table 2 as the standard deviation (1σ) of the pressure signal, show that the line with sonic device in operation (13') is much more stable than the line without sonic device (13). The standard deviation of the pressure signal is nearly one and a half (1.45) times higher for the line without sonic device (13) than for the line with sonic device.

For the line with sonic device in operation (13') a consequence of the combination of a higher average pressure and a low standard deviation is that the relative pressure fluctuation (ratio of standard deviation and average pressure) is more than 2.5 times lower. Line (13), without sonic device, shows a relative pressure fluctuation of 18% which is similar to the 22% found in the time frame shown in FIG. 6 and Table 1. For the line with sonic device in operation (13') the relative pressure fluctuation is only 7%. This lower pressure fluctuation, both absolute and relative, will result in a significantly improved stability of the pneumatic conveying system.

It is clear from FIGS. 6,6A and the statistical analysis of Tables 1, 2 that the sonic device results in dampening of the pressure fluctuations and as a consequence improved stability of the pneumatic conveying system.

In addition, the operation at an higher average pressure, in case the sonic device is in operation, will cause pressure perturbations in the flue gas duct to have smaller effect on the pressure in the conveying line and as a consequence a smaller impact on the pneumatic air speed. This results in a more stable pneumatic conveying operation.

The invention claimed is:

1. Process for pneumatically conveying a powdery material, which process comprises the steps of
pneumatically conveying said powdery material in a first pneumatic conveying pipeline from a powdery material storage tank to a recipient zone, said first pneumatic conveying pipeline being connected to said powdery material storage tank and to said recipient zone, said powdery material being pneumatically transported inside said first pneumatic conveying pipeline and into said recipient zone in a flow path by a conveying fluid flow generated by a blower connected to said first pneumatic conveying pipeline and blowing conveying fluid inside said first pneumatic conveying pipeline in which particles of said powdery material are transported,
dosing said powdery material in a dosing step at a point in the pneumatic conveying pipeline between said powdery material storage tank and said recipient zone,
wherein said process has a fluctuating pressure drop in said flow path which exists in said pneumatic conveying pipeline at any point up to said recipient zone,
providing an infrasound device as a part of said flow path of said process, said infrasound device generating infrasonic waves inside said first pneumatic conveying pipeline and/or up to said recipient zone, thereby providing a counteraction to said fluctuating pressure drop which exists in said flow path which exists in said first pneumatic conveying pipeline and/or up to said recipient zone; and
wherein said infrasound device comprises a first chamber and a second chamber, both first and second chambers being connected to each other by a tube, said infrasonic waves being generated by an exciter inside said first chamber, thereby providing infrasound pulses to said conveying fluid blown at least partially inside said first chamber, said generated infrasonic waves being transported through said tube to reach said second chamber, with a first portion of said conveying fluid blown by said blower being transported through said tube from said first chamber to said second chamber while said second portion of said conveying fluid blown by said blower is diverted and introduced inside said second chamber.

2. Process for pneumatically conveying a powdery material according to claim 1, wherein when said infrasound device provides a counteraction on said fluctuating pressure drop in said first pneumatic conveying pipeline and/or up to said recipient zone by providing a smoothing action and/or a masking action on said fluctuating pressure drop.

3. Process for pneumatically conveying a powdery material according to claim 1, wherein said powdery material is selected from the group consisting of hydrated lime, hydrated or semi-hydrated dolime, limestone, dolomite, quick lime, quick dolime, sodium carbonate or bicarbonate, sodium sesquicarbonate dihydrate, halloysite, sepiolite, a carbonaceous organic compound selected from active carbon and lignite coke, fly ash or a mixture of any of these compounds.

4. Process for pneumatically conveying a powdery material according to claim 1, wherein said conveying fluid is air, inert gas, exhaust gases, or mixture thereof.

5. Process for pneumatically conveying a powdery material according to claim 1, wherein said powdery material is dosed by a dosing device and wherein sonic waves transported inside said first pneumatic conveying pipeline during said transport of powdery material also contacts said dosing device.

6. Process for pneumatically conveying a powdery material according to claim 1, wherein said infrasonic waves travel inside said first pneumatic conveying pipeline during said transport of powdery material and also travel up to the recipient zone.

7. Process for pneumatically conveying a powdery material which process comprises the steps of:
pneumatically conveying said powdery material in a first pneumatic conveying pipeline from a powdery material storage tank to a recipient zone, said first pneumatic conveying pipeline being connected to said powdery material storage tank and to said recipient zone, said powdery material being pneumatically transported inside said first pneumatic conveying pipeline and into said recipient zone in a flow path by a conveying fluid flow generated by a blower connected to said first pneumatic conveying pipeline and blowing conveying fluid inside said first pneumatic conveying pipeline in which articles of said powdery material are transported, dosing said powder material in a dosing step with a dosing device at a point in the pneumatic conveying pipeline between said powdery material storage tank and said recipient zone, wherein said process has a fluctuating pressure drop in said flow path which exists in said pneumatic conveying pipeline at any point up to said recipient zone, providing an infrasound device as a part of said flow path of said process, said infrasound device generating infrasonic waves inside said first pneumatic conveying pipeline and/or up to said recipient zone, thereby providing a counteraction to said fluctuating pressure drop which exists in said flow path which exists in said first pneumatic conveying pipeline and/or up to said recipient zone, and wherein said infrasound device comprises a first chamber and a second chamber, both first and second chambers being connected to each other by a tube, said infrasonic waves being generated by an exciter inside said first chamber, thereby providing infrasound pulses to said conveying fluid blown at least partially inside said first chamber, said generated infrasonic waves being transported through said tube to reach said second chamber and said infrasonic waves being prevented from reaching said blower by the presence of an Helmholtz bass trap.

8. Process for pneumatically conveying a powdery material which process comprises the stem of:

pneumatically conveying said powdery material in a first pneumatic conveying pipeline from a powdery material storage tank to a recipient zone, said first pneumatic conveying pipeline being connected to said powdery material storage tank and to said recipient zone, said powdery material being pneumatically transported inside said first pneumatic conveying pipeline and into said recipient zone in a flow path by a conveying fluid flow generated by a blower connected to said first pneumatic conveying pipeline and blowing conveying fluid inside said first pneumatic conveying pipeline in which particles of said powdery material are transported, dosing said powdery material in a dosing step with a dosing device at a point in the pneumatic conveying pipeline between said powdery material storage tank and said recipient zone, wherein said process has a fluctuating pressure drop in said flow path which exists in said pneumatic conveying pipeline at any point up to said recipient zone, providing an infrasound device as a part of said flow path of said process, said infrasound device generating sonic waves inside said first pneumatic conveying pipeline and/or up to said recipient zone, thereby providing a counteraction to said fluctuating pressure drop which exists in said flow path which exists in said first pneumatic conveying pipeline and/or up to said recipient zone, wherein said infrasound device comprises a first chamber and a second chamber, both first and second chambers being connected to each other by a tube, said infrasonic waves being generated by an exciter inside said first chamber, thereby providing infrasound pulses to said conveying fluid blown at least partially inside said first chamber, said generated infrasonic waves being transported through said tube to reach said second chamber, and said process further comprising an emergency mode and an operating mode, wherein in emergency mode, the blown conveying fluid is prevented from entering said first chamber and is diverted and blown directly to said first pneumatic conveying pipeline, downstream from the infrasound device and wherein in said operating mode, said blown conveying fluid is provided at least partially to said first chamber.

* * * * *